(12) United States Patent
Gazda et al.

(10) Patent No.: US 7,526,777 B2
(45) Date of Patent: *Apr. 28, 2009

(54) WIRELESS DEVICE OPERATING SYSTEM (OS) APPLICATION PROGRAMMER'S INTERFACE (API)

(75) Inventors: Robert Gazda, Spring City, PA (US); Scott Hergenhan, Collegeville, PA (US); James MacKenzie, Berwyn, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 881 days.

This patent is subject to a terminal disclaimer.

(21) Appl. No.: 10/648,019

(22) Filed: Aug. 26, 2003

(65) Prior Publication Data
US 2004/0216125 A1 Oct. 28, 2004

Related U.S. Application Data

(60) Provisional application No. 60/405,995, filed on Aug. 26, 2002.

(51) Int. Cl.
*G06F 9/54* (2006.01)
*G06F 9/45* (2006.01)
(52) U.S. Cl. ...................... 719/328; 717/147
(58) Field of Classification Search ................ 719/328; 717/147
See application file for complete search history.

(56) References Cited

U.S. PATENT DOCUMENTS 5,493,692 A    2/1996   Theimer et al.
5,555,416 A    9/1996   Owens et al.
5,946,487 A *  8/1999   Dangelo ..................... 717/148
6,029,000 A    2/2000   Woolsey et al.
6,226,788 B1   5/2001   Schoening et al.
6,256,637 B1   7/2001   Venkatesh et al.
6,256,775 B1   7/2001   Flynn
6,263,213 B1   7/2001   Kovacs
6,272,519 B1   8/2001   Shearer et al.
6,407,751 B1 * 6/2002   Minami et al. .............. 715/736
6,493,740 B1   12/2002  Lomax
6,505,228 B1   1/2003   Schoening et al.

(Continued)

FOREIGN PATENT DOCUMENTS

WO    00/74368    12/2000

OTHER PUBLICATIONS

"Software Portability", Oliver LeCarme et al, Mc Graw-Hill Compnay, New York, 1986, pp. 1-219.*

(Continued)

*Primary Examiner*—William Thomson
*Assistant Examiner*—Abdou K Seye
(74) *Attorney, Agent, or Firm*—Volpe and Koenig, P.C.

(57) ABSTRACT

The invention relates to various aspects for modeling software, preferably for use in wireless communication devices. One aspect relates to targeting a software model to a plurality of different operating systems/operating system combinations. Another aspect relates to porting the software model to an operating environment common to all operating systems. Another aspect relates to abstracting the operating environment to an operating system/operating system combination. Another aspect relates to handling inter-processor communication. Another aspect relates to a common time manager. Another aspect relates to porting code developed using a single thread modeling tool to a multiple threaded environment. Another aspect relates to synchronizing groups of threads.

19 Claims, 28 Drawing Sheets

U.S. PATENT DOCUMENTS

| | | | |
|---|---|---|---|
| 6,606,742 B1 * | 8/2003 | Orton et al. | 717/140 |
| 6,628,965 B1 | 9/2003 | LaRosa et al. | |
| 6,631,516 B1 * | 10/2003 | Baumgart et al. | 717/143 |
| 6,711,739 B1 | 3/2004 | Kutcher | |
| 6,721,945 B1 * | 4/2004 | Sinha | 717/157 |
| 6,721,949 B1 * | 4/2004 | Tavoletti et al. | 719/310 |
| 6,725,451 B1 * | 4/2004 | Schuetz et al. | 717/151 |
| 6,754,885 B1 * | 6/2004 | Dardinski et al. | 717/113 |
| 6,757,904 B1 * | 6/2004 | Woodruff et al. | 719/319 |
| 6,804,682 B1 | 10/2004 | Kemper et al. | |
| 6,807,548 B1 | 10/2004 | Kemper | |
| 6,813,764 B2 * | 11/2004 | Stoodley | 717/153 |
| 6,842,433 B2 * | 1/2005 | West et al. | 370/312 |
| 6,851,110 B2 * | 2/2005 | Hundt et al. | 717/159 |
| 6,854,108 B1 | 2/2005 | Choi | |
| 6,856,950 B1 | 2/2005 | Abts et al. | |
| 6,901,587 B2 | 5/2005 | Kramskoy et al. | |
| 6,920,634 B1 | 7/2005 | Tudor | |
| 6,952,825 B1 | 10/2005 | Cockx et al. | |
| 6,954,922 B2 | 10/2005 | Liang | |
| 6,968,541 B1 * | 11/2005 | Hanson et al. | 717/136 |
| 6,976,253 B1 | 12/2005 | Wierman et al. | |
| 7,028,305 B2 | 4/2006 | Schaefer | |
| 7,039,738 B2 | 5/2006 | Plummer et al. | |
| 7,062,766 B2 | 6/2006 | Ronkka et al. | |
| 7,082,432 B2 | 7/2006 | Bhogi et al. | |
| 7,082,604 B2 | 7/2006 | Schneiderman | |
| 7,162,718 B1 | 1/2007 | Brown et al. | |
| 7,174,554 B2 | 2/2007 | Pierce et al. | |
| 2001/0027464 A1 * | 10/2001 | Tavoletti et al. | 709/103 |
| 2002/0006137 A1 * | 1/2002 | Rabenko et al. | 370/466 |
| 2002/0091800 A1 * | 7/2002 | Wilkinson et al. | 709/219 |
| 2002/0174215 A1 * | 11/2002 | Schaefer | 709/224 |
| 2003/0233647 A1 | 12/2003 | Blaser et al. | |
| 2004/0025042 A1 * | 2/2004 | Kouznetsov et al. | 713/200 |
| 2004/0054821 A1 * | 3/2004 | Warren et al. | 710/8 |
| 2004/0162103 A1 | 8/2004 | Montes | |

OTHER PUBLICATIONS

Software Portability with imake, Paul DuBois, Second Edition, O'Reilly & Assoc., 1996, pages Whole Manual.*
Nu-Mega Technologies, Inc. (Company Literature), Bounds-Checker User's Guide ,, Chapter 6, "Customizing Data Checking with Routine-Dat", pp. 75-83, printed Jul. 21, 1998.*
"Porting The GNU C Compiler for Dummies", Hans-Peter Nilsson, Dec. 1, 1998, 96 pages.*
Ryan, "Synchronization in Portable Device Drivers", Operating Systems Review (SIGOPS), ACM Headquarters, vol. 32, No. 4, Oct. 1998, pp. 62-69.
Le Carme et al. "Software Portability." McGraw-Hill Company, New York, 1986, pp. 1-219.
DuBois, Paul. "Software Portability with Imake," O'Reilly & Assoc., 1996, Whole Manual.
Nu-Mega Technologies, Inc. (Company Literature). "Bounds-Checker User's Guide," Chapter 6, "Customizing Data Checking with Routine-Dat," Jul. 21, 1998, pp. 75-83.
Nilsson, Hans-Peter. "Porting the GNU C Compiler for Dummies," Dec. 1, 1998, 96pp.
Wolf et al. "Portable Compiler Eases Problems of Software Migration." System Design/Software, 1984, pp. 147-153.
Steffen, Joseph L. "Adding Run-Time Checking to the Portable C Compiler." John Wiley & Sons, Oct. 21, 1991, pp. 305-316.
Roberts et al. "A Portable Assembler Reverse Engineering Environment (PARE)," IEEE WCRE'96, pp. 76-85.
Maguire, Steve. "Writing Solid Code." Microsoft Press, 1993, pp. 111-117.
I2O Special Interest Group "Intelligent I/O (I2O) Architecture Specification Version 2.0", Online!, Mar. 1999, pp. 1-98, http://embedded.ifmo.ru/lib/DOC/RTOS/I2O/V2.0_spec.pdf.
LeCarme et al. "Software Portability." McGraw-Hill Company, New York, 1986, pp. 1-219.
DuBois, Paul. "Software Portability with Imake," Second Edition, O'Reilly & Assoc., 1996, Whole Manual.
Nu-Mega Technologies, Inc. (Company Literature), "Bounds-Checker User's Guide," Chapter 6, "Customizing Data Checking with Routine-Dat," Jul. 21, 1998, pp. 75-83.
Nilsson, Hans-Peter. "Porting the GNU C Compiler for Dummies," Dec. 1, 1998, 96 pages.
Roa et al, "iMobile: A Proxy-Based Platform for Mobile Services," ACM, pp. 3-10, (2001).
Dirckze et al., "A Pre-Serialization Transaction Management Technique For Mobile Multidatabases," *Mobile Networks and Applications 5*, pp. 311-321, (2001).
Nikolaou et al., "Wireless Convergence Architecture: A Case Study Using GSM and Wireless LAN", *Mobile Networks and Applications 7*, pp. 259-267, (2002).
National Semiconductor Corporation, "DS90CR211/DS90CR212 21-Bit Channel Link", USA, XP002306540; URL:http://www/national.com/ds/DS/DS90CR211.pdf, pp. 1-14, (Jul. 1997).
Novak et al., "Channel Link Moving and Shaping Information In Point-to-Point Applications," National Semiconductor Corporation, XP002306541; URL:http://www.natiional.com/an/AN/AN-1041.pdf, pp. 1-8, figures 1-5, (May 1996).
Von Herzen et al., "Multi-Channel 622 Mb/s LVDS Data Transfer for Virtex-E Devices", Jan. 6, 2001, Xilinx Inc., XP002306542, URL:http://direct.xilinx.com/bvdocs/appnotes/xapp233.pdf, pp. 1-17, (Jan. 6, 2001).
Kitanovska et al, "Bus LVDS with Virtex-E Devices," Xilinx Inc., USA, XP002307032, URL:http://direct.xilinx.com/bvdocs/appnotes/xapp243.pdf., (Jul. 26, 2000).

* cited by examiner

| PROCESS ID | | TRANSITION ID | |
|---|---|---|---|
| 0000 | | 0000 | START |
| | | 0001 | |
| FFFC | | FFFC | |
| FFFD | TIMER * | FFFD | DISCARD |
| FFFE | ENV | FFFE | SAVE |
| FFFF | NULL | FFFF | NULL |

| SIGNAL ID | | STATE ID | |
|---|---|---|---|
| 0000 | START | 0000 | ASTERISK |
| 0001 | | 0001 | |
| | | FFFD | |
| FFFE | | FFFE | DORMANT |
| FFFF | ASTERISK | FFFF | START |

FIG. 6

WIRELESS DEVICE OPERATING SYSTEM (OS) APPLICATION PROGRAMMER'S INTERFACE (API)

CROSS REFERENCE TO RELATED APPLICATION(S)

This application claims priority from U.S. provisional application No. 60/405,995, filed Aug. 26, 2002, which is incorporated by reference as if fully set forth.

FIELD OF INVENTION

This invention generally relates to wireless devices. In particular, the invention relates to developing software to run on hardware of such devices.

BACKGROUND

Developing software to effectively use hardware, such as communication processors and system processors, of wireless devices is difficult. Wireless devices have limited memory storage capacity, making it desirable that software operating systems, interfaces and applications have a small footprint. However, using reduced footprint software design techniques limits the flexibility accorded to software designers.

To illustrate, one tool for producing software modeling language SDL code is Telelogic Tau. That tool allows for software programmers to produce a model of the software and the tool produces code from the model. Telelogic Tau has two potential code generators, C-advanced and C-micro. C-advanced allows a software designer to use all the features of SDL. C-micro limits the available features with the advantage of producing a smaller code footprint.

Telelogic Tau supports both light and tight integration. In light integration, the entire SDL system executes in a single thread. In tight integration, each SDL process becomes a thread. To minimize the code footprint, C-micro is desirable to be used. However, C-micro only supports light integration and, accordingly, multiple threads of execution are not supported. Accordingly, it is desirable to have code with a reduced footprint that supports multiple threads of execution.

Another difficulty in wireless device software design is the application programmer's interfaces (APIs). Currently, several alternative open platform operating systems (OSs) are available for wireless devices, such as Symbian EPOC, Microsoft Windows CE and Palm OS, and several alternative real time operating systems (RTOS) are available, such as OSE, DSP BIOS and an alternate RISC RTOS. It is desirable to have an API that is capable of targeting a protocol stack, such as a third generation partnership project (3 GPP) universal mobile telecommunication system (UMTS) protocol stack, to all the different combinations of RTOSs and OSs.

Additionally, the hardware structures of wireless devices vary. The boundary between a system processor, such as an advanced reduced instruction set processor (RISC), and a communication processor, such as a digital signal processor (DSP), vary from device to device. Accordingly, it is desirable for an API to effectively hide this boundary.

SUMMARY

The invention relates to various aspects for modeling software, preferably for use in wireless communication devices. One aspect relates to targeting a software model to a plurality of different operating systems/operating system combinations. Another aspect relates to porting the software model to an operating environment common to all operating systems. Another aspect relates to abstracting the operating environment to an operating system/operating system combination. Another aspect relates to handling inter-processor communication. Another aspect relates to a common time manager. Another aspect relates to porting code developed using a single thread modeling tool to a multiple threaded environment. Another aspect relates to synchronizing groups of threads.

BRIEF DESCRIPTION OF THE DRAWING(S)

FIG. 6 is a list of preferred reserved SDL process identities.

DETAILED DESCRIPTION OF THE PREFERRED EMBODIMENT(S)

Figure 1:
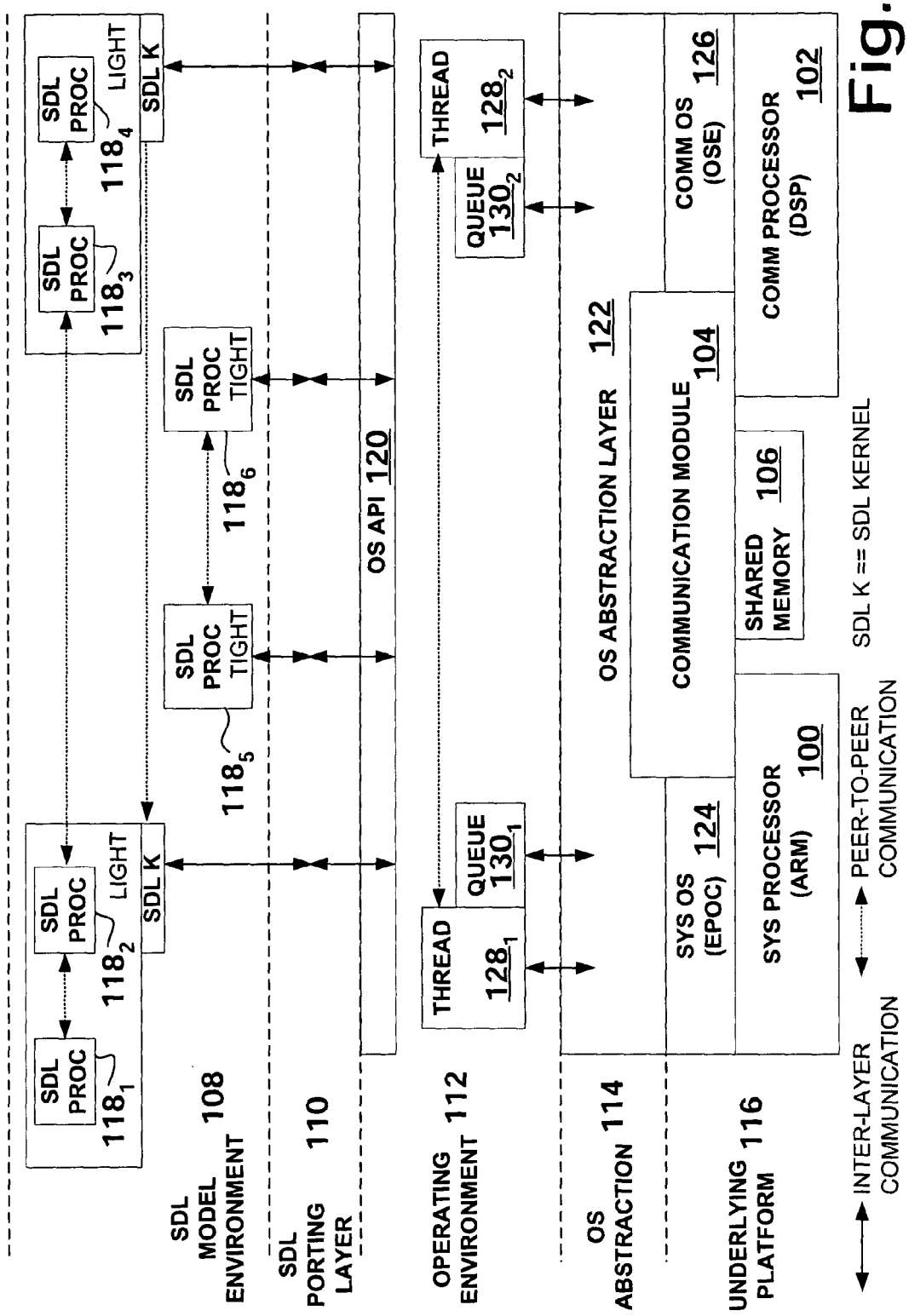
FIG. 1 is a simplified diagram of one configuration of a wireless device with software and programmers interface illustrated.

FIG. 1 is a simplified diagram of one configuration of a wireless device with software and programmers interface also illustrated. One such wireless device is a wireless transmit/receive unit. A wireless transmit/receive unit (WTRU) includes but is not limited to a user equipment, mobile station, fixed or mobile subscriber unit, pager, or any other type of device capable of operating in a wireless environment. Although the preferred embodiment uses the hardware configuration of FIG. 1, alternate hardware configurations can be used with the wireless device software.

The wireless device has a system processor 100, such as a RISC. The system processor 100 typically runs the system applications, such as web browsing, calendars, etc. A communication processor 102, such as a DSP, typically runs the wireless communication protocols. A communication module 104 allows for communication between the system and communication processor. A shared memory 106 is accessible by both processors 100 and 102 via the communication module 104.

FIG. 1 also illustrates the preferred software structure of the wireless device and its association with the hardware. The SDL model layer 108 represents the communication protocol stack components at very high level of abstraction. The SDL model environment 108 is composed of SDL processes $118_1$ to $118_6$ (118) communicating at a peer-to-peer level via SDL signals. SDL model elements (processes and signals) are transformed into operating environment elements by targeting the code generator to the operating system adaptive port interface (OS API) 120.

The SDL porting layer 110 represents the conversion of SDL model elements (processes, signals, partitions, etc.) into operating environment constructs through the OS API 120. The operating environment 112 provides an OS/hardware independent environment via the OS API 120. The preferred operating environment 112 operates independent of the underlying OSs. As a result, the software is independent of the operating system. Accordingly, if the underlying OSs change, the software does not have to be rewritten. The OS abstraction layer 114 implements the OS API 120 for a particular underlying operating system and hardware platform. It maps the OS API 120 constructs into their underlying OS representations. The abstraction layer 122 provides a direct implementation for functionality that an underlying OS does not support. For example, if an OS does not support messages and message queues, the OS abstraction layer would provide its own implementation.

The OS abstraction layer interfaces with the communication module 104 to support inter-processor communication. The preferred OS abstraction layer 122 allows for device drivers to cross processor boundaries. To illustrate, an audio driver may need to be present for the system OS 124, but the audio hardware may be present on the DSP 102. The communication module 104 provides the communication path between the OS API threads $128_1$ to $128_2$ (128) across the system/communication processor boundary and is responsible for the transfer for both data and control. As shown in FIG. 1, a queue $130_1$ to $130_2$ (130) is associated with each thread 128. The communication module 104 provides the communication path between OS API threads across the system/communication processor boundary. It is responsible for the transfer of both data and control. A system OS 124 is associated with the system processor 100 and the communication OS 126 is associated with the communication processor 102.

Although, all of the layers work together in the preferred software structure, each layer can be typically used with other layers in alternate software structures.

Figure 2:
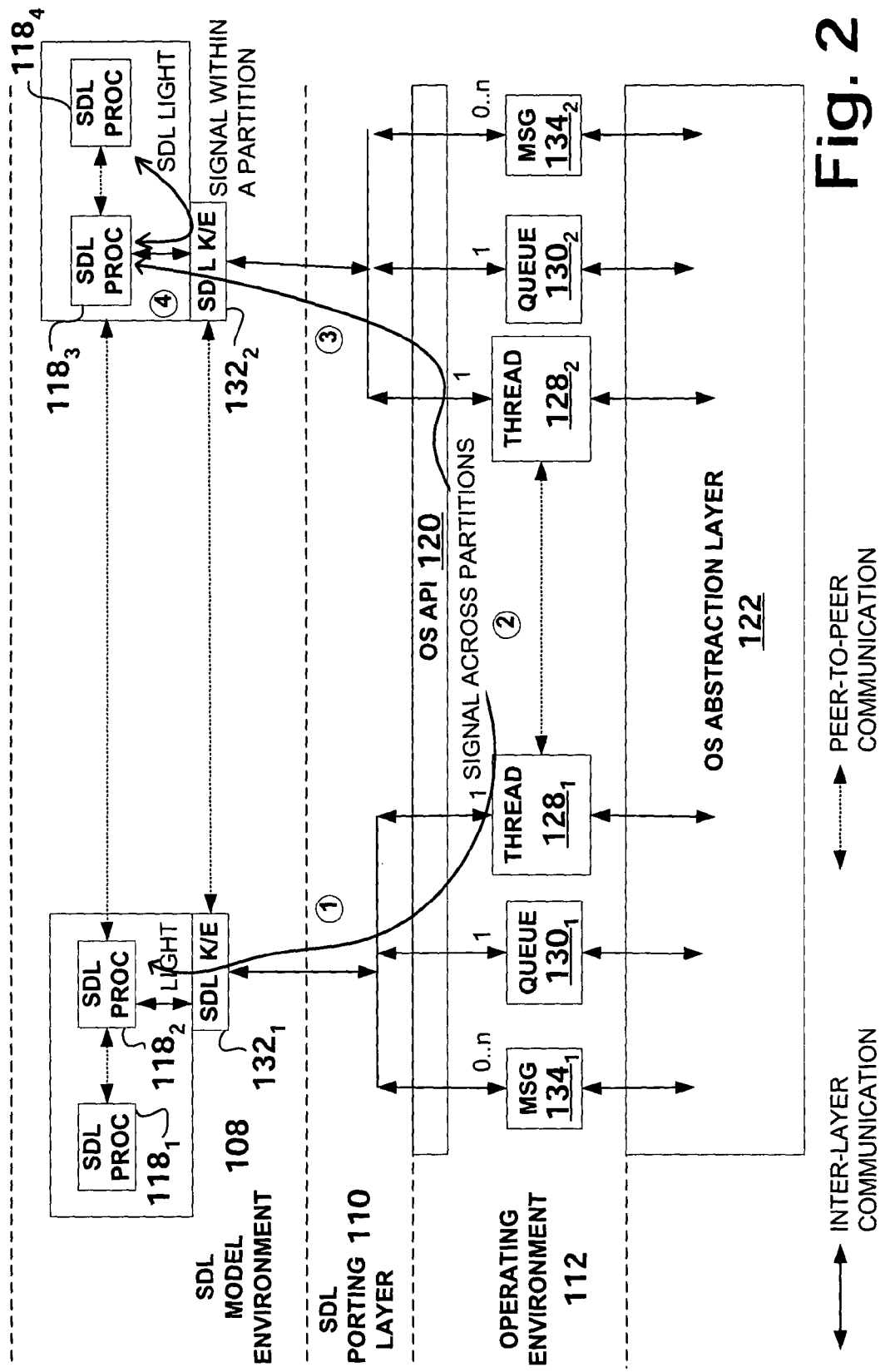
FIG. 2 is an illustration of messaging between SDL processes using light integration across partitions.
Figure 3:
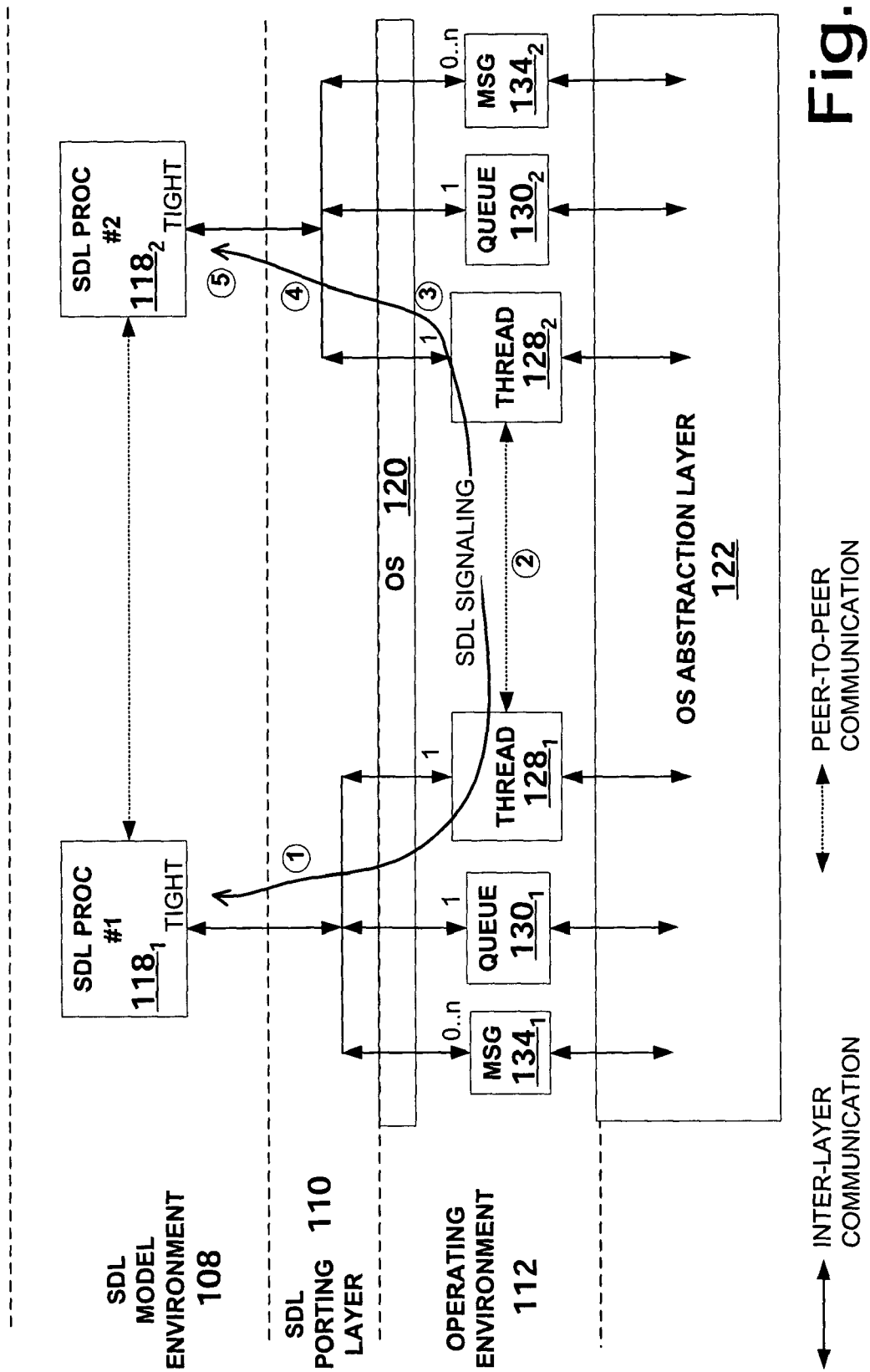
FIG. 3 is an illustration of messaging between SDL processes within a partition using tight integration.
Figure 4:
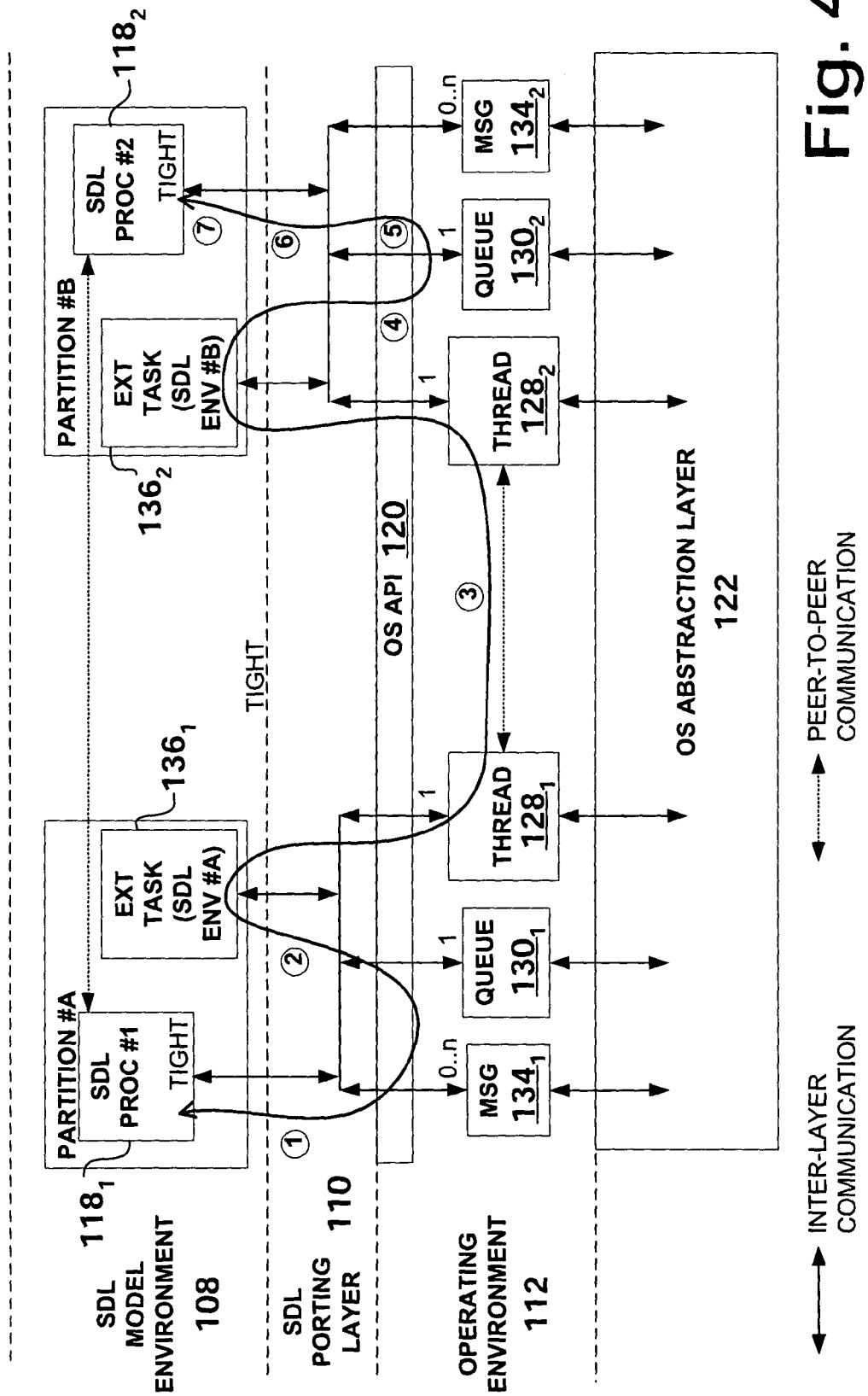
FIG. 4 is an illustration of messaging between SDL processes across partitions using tight integration.

FIGS. 2 to 4 illustrate of communication between SDL processes 118. FIG. 2 is an illustration of messaging between SDL processes 118 using light integration. SDL processes 118 execute on top of an SDL Kernel (K/E) $132_1$ to $132_2$ (132). The SDL kernel 132 manages communication between the processes 118, routing signals to their appropriate recipients. The SDL model 108 may be divided into separate light integration partitions. Each partition contains its own SDL kernel 132, and resolves to a single thread 128 with a queue 120 within the operating environment 112. Each partition's SDL kernel 132 manages communication between internal SDL processes 118 without OS assistance. The SDL kernel 132 forwards signals destine for SDL processes 118 external to its partition through the operating environment 112 via messages $134_1$ to $134_2$ (134).

Initially, the signal from one SDL process $118_2$ is converted to an OS message by the SDL kernel 132, in a first environment. The message is routed to an SDL kernel $132_2$ in a second environment. In other words, the message is "put" in the second environments queue $130_2$. The SDL kernel $132_2$ in the second environment detects the message, and converts the received message back to its signal format. The second environment SDL kernel $132_2$ signals the appropriate process.

Fundamentally, each SDL light integration partition resolves to a thread with a single message queue within the operating environment. Communication between partitions occurs via messaging. Each SDL kernel/environment knows what SDL processes 118 are internal, and what SDL processes 118 are external. Each SDL kernel/environment knows where to route external signals (i.e. what partition their recipient resides) and each SDL kernel/environment knows how to convert signals to messages, and vice versa.

FIG. 3 is an illustration of messaging between SDL processes 118 within a partition using tight integration. Using tight integration, the SDL model 118 maps directly to the operating environment 112. All SDL process communication (signaling) takes place through the operating environment 112. The SDL kernel (SDL process scheduler) is not included using tight integration. Specifically, each SDL process resolves to a thread 128 with a single message queue 130 within the operating environment 112. Communication between SDL processes 118 takes place through the operating environment 112. The SDL porting layer 110 converts signals to messages 134, and vice versa.

For a first SDL process $118_1$ to signal a second SDL process $118_2$, the first process $118_1$ converts the signal into an OS message. That message is routed to the second SDL process thread $128_2$ via its message queue $130_2$. That SDL Process thread $128_2$ wakes up on the message and the message is converted back to a SDL signal. The second SDL Process $118_2$ receives the signal from first SDL Process $118_1$.

FIG. 4 is an illustration of messaging between SDL processes across partitions using tight integration. For a first SDL process $118_1$ to signal a second SDL process $118_2$, the first process $118_1$ converts the signal into an OS message. That message is routed to the first partition external task $136_1$. This environment is the environment acting as a proxy for all processes external to this partition. That partition external task $136_1$ forwards the message (signal) to the second partition External Task $136_2$. The second partition external task $136_2$ routes the message (signal) to the second process thread $128_2$ via its message queue $130_2$. That thread wakes up on the message. The message is converted back to a SDL signal and the second SDL process $118_2$ receives the signal from the first SDL process $118_1$.

This procedure facilitates talking across processor boundaries. The partitions can by targeted to a specific processor and to function across the boundaries external tasks 136 may be used.

Abbreviations

ADT—Abstract Data Type

API—Application Programmer's Interface (Client Interface in this context)

CPU—Hardware (HW) Processor: system RISC (such as an ARM) or DSP.

IPC—Inter-processor Communication

OS—Operating System

HAL—Hardware Abstraction Layer

HW—Hardware

MUX—Mutex

SoC—System-On-a-Chip

SW—Software

Terms and Definitions

Communications Processor—Embedded CPU (DSP) executing low-level communication protocol stack layers, algorithms, device drivers, etc.

Operating Environment—Abstract programming environment provided by the OS abstraction layer through the OS API.

Open Platform—Operating system with a published (or publicly available) API. Third party organizations develop user-level applications to the published API.

Proxy—Placeholder or surrogate for another object, controlling access to it. Used in the OS Abstraction to present constructs physically located on a remote processor.

System Processor—General-purpose CPU executing an "Open Platform" operating system or a real time operating system (RTOS) including user-level applications.

Underlying Operating System—A target OS on which the OS abstraction layer and the OS API are built.

The operating environment 112 preferably hides the underlying OS and HW structure from its clients via an OS abstraction layer 122. This includes dual processor HW architectures. The operating environment 112 via the OS API preferably provide services to the following clients: SDL processes 118 (protocol stack model) and device drivers and software components.

The OS constructs are defined in an OS independent manner. Table 1 provides definitions for each of the OS constructs supported by the preferred OS API 120.

TABLE 1

| OS Construct: | Definition: |
|---|---|
| Thread | Independent path of execution. Managed on a priority basis. |
| Process | Independent path of execution (thread) with its own protected address space. Note, a process may contain more than thread. |
| Thread Group | Grouping of threads, managed collectively to synchronize their execution. Each thread within the group contains an independent path of execution, scheduled on a priority basis. The thread group synchronizes the initialization of all threads within the group.<br>Basic Functions:<br>Synchronize—Bring-up or start all threads within the group, synchronizing them to a common initialization point. Specifically, all threads initialize, and block.<br>Start—Allow all threads within the group to begin their "main" path of execution after initialization and synchronization. |
| Mutex | Thread synchronization element providing mutual exclusion to shared resources: memory regions/buffers, hardware devices, etc.<br>Related terms: Semaphore, Critical Section, etc.<br>Basic functions:<br>Lock—Block if the MUX is locked by another thread, otherwise acquire the MUX and continue.<br>Release—unlock or release the MUX. |

TABLE 1-continued

| OS Construct: | Definition: |
|---|---|
| Event | Thread synchronization element, allowing threads to coordinate execution. A thread may inform another thread of some condition by signaling an event.<br>Basic functions:<br>Set—signals the event.<br>Wait—blocks until the event is signaled or set.<br>Events allow one thread to "pass control" to another thread. |
| Message | Communication/synchronization element between threads. A message allows threads to exchange information through a common interface.<br>Messages allow one thread to "pass control" and to "pass data" to another thread. |
| Message Queue | Manages message communication between threads. Includes transparent communication across the processor boundary.<br>Basic functions:<br>FIFO behavior.<br>Put—places a message on the queue.<br>Put After—places a message on the queue after an indicated delay.<br>Wait—returns the message at the head of the queue. If no messages reside on the queue, block until one does.<br>Get—returns the message at the head of the queue, if available. Does not block on empty.<br>Variations:<br>Priority messages. Messages ordered on the queue based on relative priority.<br>Across the processor boundary: message data copied from the sender's memory space to the receiver's memory space.<br>Within a processor: no data copy.<br>Pointers cannot be included within a message due to processor boundary restrictions. |
| FIFO | Manages transfer for blocks of data between threads, including transparent data transfer across the processor boundary. Simpler than messages.<br>Basic Functions:<br>Put: places a memory block on the FIFO.<br>Get: pulls a memory block from the FIFO.<br>Wait: pends on the FIFO until a memory block appears. Pulls and returns.<br>Across the processor boundary: data copied from the sender's memory space to the receiver's memory space. (This will depended on the HW architecture.)<br>Within a processor: no data copy. |
| Linked List | Generic list, providing a common implementation.<br>Basic Functions:<br>Add: place elements in the list.<br>Get: read elements in the list.<br>Remove: pull elements from the list.<br>Iterate: provides all three services while iterating over the list. |

TABLE 2

Other miscellaneous OS elements are defined per Table 2.

| OS Construct: | Definition: |
|---|---|
| Memory Allocation/De-allocation: | Memory allocation/de-allocation management.<br>Several variants:<br>General: allocation from a generic system heap.<br>Local: allocation from a locally defined heap.<br>Communication: allocation of communication buffers (i.e. memory buffers passed up and down the protocol stack). Such buffers may need to be shared across the system/communication processor boundary. |
| Delay (Sleep) | Allows a thread to pause its execution for a specified unit of time (milliseconds). |

The SDL Porting layer 110 takes the SDL model elements, such as processes 118, signals, partitions, etc., and converts them into operating environment constructs. The following is the preferred embodiment of the OS API 120.

The OS API 120 has API entry points. All API entry points are named using the following convention:

os_<action><construct>( . . . )

Prefix—All API entry points are preceded with the "os_" prefix for identification.

Action—<action> field indicates what operation will be performed on the construct.

Construct Name—<construct> field identifies the construct receiving the action, or operation.

The OS API data structures are as follows. All the constants, defined in the API, are preceded with the "OS_" prefix for identification. All the API data types are preceded with the "Os_" prefix for identification. Individual enumeration values are preceded with the "OS_" prefix.

All Operating Environment elements are identified and referred to by a unique handle (Os_Handle_T). When the construct is created or opened, its assigned a handle, and that handle is used whenever the element is utilized.

All OS API entry points, with a few exceptions, return the generic OS Return Type (Os_Rtn_E). All time-relative API entry points (for example, os_putAfterMsgQ) return an OS Cancel ID to the caller (Os_CancelId_T). The Cancel ID may be used to cancel or terminate the time-relative operation, using an associated cancel entry point (for example, os_cancelPutAfterMsgQ).

Thread Priority Level (Os_ThreadPriority_E) represents the relative priority assigned to a thread, or a synchronized thread with a thread group. Preferred thread priority levels are per Table 3.

TABLE 3

| | |
|---|---|
| OS_THREAD_PRIORITY_LEVEL0 | Highest priority level. |
| OS_THREAD_PRIORITY_LEVEL1 | . |
| OS_THREAD_PRIORITY_LEVEL2 | . |
| OS_THREAD_PRIORITY_LEVEL3 | . |
| OS_THREAD_PRIORITY_LEVEL4 | . |
| OS_THREAD_PRIORITY_LEVEL5 | . |
| OS_THREAD_PRIORITY_LEVEL6 | . |
| OS_THREAD_PRIORITY_LEVEL7 | Lowest priority level. |

Different operating systems may handle scheduling of threads at the same priority level differently. For example, some round robin "run-able" threads at the same level on a time slice or quantum basis. Others allow "run-able" threads to individually run to completion (i.e. until they block). EPOC falls under the former and OSE the latter. Accordingly, threads assigned to the same priority level are checked prior to the assignment.

The thread function defines "client provided" entry points into a thread or a synchronized thread. All entry points must be a "C" function accepting a void * argument and returning void, as defined by: Os_ThreadFunction_T.

typedef void (Os_ThreadFunction_T)(void*arg_p)

The OS Time MS represents time in milliseconds. One count or tick is 1 ms.

typedef Uint32 Os_TimeMS_T

A Mutex is a fundamental thread synchronization element providing mutual exclusion to shared resources. Mutexs are not shared across processes, or processor boundaries.

The following are Mutex services. Creates create an operating environment Mutex, allocating all required underlying OS resources. The caller provides a reference to a handle. This call will populate the handle reference with a unique value, identifying the created Mutex.

| Prototype: |
|---|
| Os_Rtn_E<br>os_createMux( Os_Handle_T *handle_p ); |

| Parameters: | |
|---|---|
| *handle_p | Mutex Handle, filled in by this call on successful creation |

| Returns: | |
|---|---|
| OS_RTN_OK | Successful creation. |
| OS_RTN_ERROR | Failed to allocate underlying OS resources. |

The destroy entry point destroys or deletes an operating environment Mutex, releasing all allocated underlying OS resources. After this call, the Mutex Handle is invalid and is no longer utilized.

| Prototype: |
|---|
| Os_Rtn_E<br>os_destroyMux( Os_Handle_T handle ); |

| Parameters: | |
|---|---|
| Handle | OS Handle, identifying the MUX. |

| Returns: | |
|---|---|
| OS_RTN_OK | Successful deletion. |
| OS_RTN_BAD_PARAM | Invalid Mutex handle. |

The lock entry point locks or acquires an operating environment mutex. If the mutex is locked by another thread, this call will block until the locking thread releases the mutex. If multiple threads are blocked waiting on the mutex, the thread with the highest relative priority will gain access to the mutex. The priority inheritance is proven/verified within the underlying operating system.

| Prototype: |
|---|
| Os_Rtn_E<br>os_lockMux( Os_Handle_T handle ); |

| Parameters: | |
|---|---|
| Handle | OS Handle, identifying the MUX. |

| Returns: | |
|---|---|
| OS_RTN_OK | Successful, mutex is locked. |
| OS_RTN_BAD_PARAM | Invalid Mutex handle. |

The release entry point releases an acquired or locked mutex. This call will unblock the highest priority thread, pending on the mutex. The priority inheritance is proven/verified within the underlying operating system.

| Prototype: |
|---|
| Os_Rtn_E<br>os_releaseMux( Os_Handle_T handle ); |

| Parameters: | |
|---|---|
| handle | OS Handle, identifying the MUX. |

| Returns: | |
|---|---|
| OS_RTN_OK | Successful, the mutex was released. |
| OS_RTN_BAD_PARAM | Invalid Mutex handle. |

An Event is a thread synchronization element, allowing a thread to signal another thread of some condition.

The following are event services. The create entry point creates an operating environment event, allocating all required underlying OS resources. The caller provides a reference to a handle. This call populates the handle reference with a unique value, identifying the created Event.

| Prototype: |
|---|
| Os_Rtn_E<br>os_createEvent( Os_Handle_T *handle_p ); |

| Parameters: | |
|---|---|
| *handle_p | Event Handle, filled in by call on successful creation |

| Returns: | |
|---|---|
| OS_RTN_OK | Successful creation. |
| OS_RTN_ERROR | Failed to allocate underlying OS resources. |

The destroy entry point destroys or deletes an operating environment event, releasing all allocated underlying OS resources. After this call, the event handle is invalid and is no longer utilized.

| Prototype: |
|---|
| Os_Rtn_E<br>os_destroyEvent( Os_Handle_T handle ); |

| Parameters: | |
|---|---|
| handle | OS Handle, identifying the Event. |

| Returns: | |
|---|---|
| OS_RTN_OK | Successful deletion. |
| OS_RTN_BAD_PARAM | Invalid Event handle. |

The set entry point sets an operating environment event. This call will unblock all threads, pending on the event.

| Prototype: |
|---|
| Os_Rtn_E<br>os_setEvent( Os_Handle_T handle ); |

| Parameters: | |
|---|---|
| Handle | OS Handle, identifying the Event. |

| Returns: | |
|---|---|
| OS_RTN_OK | Successful, the event is set. |
| OS_RTN_BAD_PARAM | Invalid Event handle. |

The pend entry point blocks an operating environment event, until it is set or signaled. If the event is set, this call clears the event and returns immediately. Otherwise, it blocks until another thread sets the event. When set, the blocked thread wakes, the event is cleared, and control returned to the caller.

| Prototype: |
| --- |
| Os_Rtn_E<br>os_pendEvent( Os_Handle_T handle ); |

| Parameters: | |
| --- | --- |
| handle | OS Handle, identifying the Event. |

| Returns: | |
| --- | --- |
| OS_RTN_OK | Successful, the event has been set, and is now clear. |
| OS_RTN_BAD_PARAM | Invalid Event handle. |

The clear entry point clears an operating environment event. If the event is not set, this service becomes a NOP.

| Prototype: |
| --- |
| Os_Rtn_E<br>os_clearEvent( Os_Handle_T handle ); |

| Parameters: | |
| --- | --- |
| Handle | OS Handle, identifying the Event. |

| Returns: | |
| --- | --- |
| OS_RTN_OK | Successful, the event is now clear. |
| OS_RTN_BAD_PARAM | Invalid Event handle. |

The check entry point checks the state of an operating environment event, set or clear.

| Prototype: |
| --- |
| Bool<br>os_checkEvent( Os_Handle_T handle ); |

| Parameters: | |
| --- | --- |
| Handle | OS Handle, identifying the Event. |

| Returns: | |
| --- | --- |
| TRUE | Event is set. |
| FALSE | Event is clear, or any error condition. |

A thread represents a single independent path of execution within the operating environment 112 and, in turn, the underlying software system. All threads within the system are scheduled on a priority, time-sliced basis via the underlying operating system. Threads within a single process share a common linear address space.

The thread services are as follows. The create entry point creates an operating environment thread, allocating all required underlying OS resources. If the suspend flag is clear, the thread will be started immediately, and its "Main Loop" will be invoked by the underlying OS scheduler based on its priority. Otherwise, the thread is suspended, and will not become schedulable until it is explicitly resumed. The "Main Loop" represents the thread's main path of execution. This function should never return. The caller provides a reference to a handle. This call will populate the handle reference with a unique value, identifying the created Thread.

| Prototype: | |
| --- | --- |
| Os_Rtn_E<br>os_createThread(<br>    Os_Handle_T<br>    Uint32<br>    Os_ThreadPriority_E<br>    Os_ThreadFunction_T<br>    Bool<br>    void | <br><br>*handle_p,<br>stackSize,<br>priority,<br>*mainLoop_fp,<br>bSuspended,<br>*argument_p); |

| Parameters: | |
| --- | --- |
| *handle_p | Thread Handle, filled in by this call on successful creation. |
| stackSize | Stack Size for the created Thread in bytes. |
| Priority | Priority for the created Thread. |
| *mainLoop_fp | Reference to the Thread's Main Loop. |
| bSuspended | Suspended Flag. TRUE == create Thread suspended. |
| *argument_p | Argument for the created Thread. Passed to the Thread's Main Loop. |

| Returns: | |
| --- | --- |
| OS_RTN_OK | Successful creation. |
| OS_RTN_BAD_PARAM | Bad input parameter detected. |
| OS_RTN_ERROR | Failed to allocate underlying OS resources. |

The destroy entry point destroys or deletes an operating environment thread, releasing all allocated underlying OS resources. This call does not free resources that the thread may have allocated internally during its execution. To prevent leaks, all such resources are de-allocated before the thread is destroyed. After this call, the thread handle is invalid and is no longer utilized.

Prototype:

```
Os_Rtn_E
    os_destroyThread( Os_Handle_T handle );
```

Parameters:

| | |
|---|---|
| Handle | OS Handle, identifying the Thread. |

Returns:

| | |
|---|---|
| OS_RTN_OK | Successful deletion. |
| OS_RTN_BAD_PARAM | Invalid Thread handle. |

The suspend entry point suspends an operating environment thread. The underlying OS will not schedule the thread until it is resumed.

Prototype:

```
Os_Rtn_E
    os_suspendThread( Os_Handle_T handle );
```

Parameters:

| | |
|---|---|
| Handle | OS Handle, identifying the Thread. |

Returns:

| | |
|---|---|
| OS_RTN_OK | Successful. |
| OS_RTN_BAD_PARAM | Invalid Thread handle. |

The resume entry point resumes the execution of a suspended operating environment thread. The underlying OS will schedule the thread based on its priority.

Prototype:

```
Os_Rtn_E
    os_suspendThread( Os_Handle_T handle );
```

Parameters:

| | |
|---|---|
| handle | OS Handle, identifying the Thread. |

Returns:

| | |
|---|---|
| OS_RTN_OK | Successful. |
| OS_RTN_BAD_PARAM | Invalid Thread handle. |

Figure 5A:
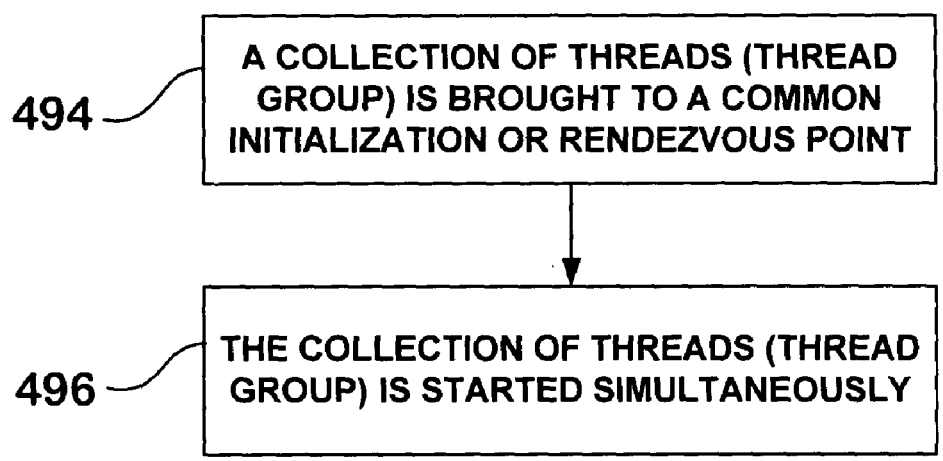
FIG. 5A is a flow chart for processing using thread groups.

A thread Group coordinates/synchronizes the bring-up or initialization of a group of threads. FIG. 5A is a flow chart for processing using thread groups. The thread group provides services to:

Synchronize a collection of threads (i.e. bring-up all threads in the group to a common initialization or rendezvous point), 494.

Start the collection, simultaneously (i.e. start each thread's main execution path after synchronization), 496.

All threads within a group must be specified when the thread group is created.

Thread groups do not utilize standard threads. Instead, a client provides the group with a set of specialized threads, called "SyncThreads". A SyncThread expands the base functionality found within a standard thread, extending it to include two entry points: an "Init" function and a "Main Loop" function. When the group is synchronized, the "Init" function will be invoked for each SyncThread within the group, based on its priority. The "Init" function must perform all internal activities required to initialize its thread, and return. For example, create a message queue, allocate some scratch pad memory, initialize a driver or some hardware, etc. When the group is started, the "Main Loop" function will be invoked within each thread by the underlying OS based on its priority. The "Main Loop" represents the thread's main path of execution. This function should never return.

Similar to standard threads, all SyncThreads within a single process share a common linear address space.

When a Thread Group is created, the client provides it with a SyncThread data table containing all the information required to create and manage the threads. Each entry in the table contains the Os_SyncThreadData_S data type as per Table 4.

TABLE 4

| | |
|---|---|
| stackSize | Stack Size in bytes. |
| priority | Thread Priority |
| *init_fp | Reference to the "Init" function for this SyncThread. |
| *initArg_p | "Init" Argument. Passed to the SyncThread's "Init" function. |
| *loop_fp | Reference to the "Main Loop" function for this SyncThread. |
| *loopArg_p | "Main" Argument. Passed to the SyncThread's "Main Loop" function. |

The SyncThread data table is terminated with null entry indication:

OS_SYNC_THREAD_NULL.

This entry point creates an operating environment thread group, creating all the SyncThreads within the group and their underlying OS resources. The create operation does not start the threads. The creating client must explicitly start them via the synchronize and start operations.

The caller provides a reference to a handle. This call will populate the handle reference with a unique value, identifying the created thread group.

Prototype:

```
Os_Rtn_E
    os_createThreadGroup( Os_Handle_T      *handle_p,
        Os_SyncThreadData_S*syncTable_p );
```

| Parameters: | |
|---|---|
| *handle_p | Thread group handle, filled in by this call on successful creation |
| *syncTable_p | Pointer to the first entry in this thread group's SyncThread table. The provided table must be made up of continuous Os_SyncThreadData_S entries, terminated with an OS_SYNC_THREAD_NULL. |

| Returns: | |
|---|---|
| OS_RTN_OK | Successful creation. |
| OS_RTN_BAD_PARAM | Bad parameter detected within the SyncThread Table. |
| OS_RTN_ERROR | Failed to allocate underlying OS resources. |

The destroy entry point destroys or deletes an operating environment thread group; destroying all of the group's SyncThreads and releasing all group allocated underlying OS resources. This call does not free resources that may have been allocated internal to any of the SyncThreads. To prevent leaks, all such resources are de-allocated before the thread group is destroyed. After this call, the thread group handle is invalid and is no longer utilized.

| Prototype: |
|---|
| Os_Rtn_E os_destroyThreadGroup( Os_Handle_T handle ); |

| Parameters: | |
|---|---|
| handle | OS Handle, identifying the Thread Group. |

| Returns: | |
|---|---|
| OS_RTN_OK | Successful deletion. |
| OS_RTN_BAD_PARAM | Invalid Thread Group handle. |

The initialize/synchronize entry point synchronizes all SyncThreads within an operating environment thread group. It ensures that each SyncThread within the group has initialized. Specifically, this call will not return until all threads execute their "Init" function and return.

| Prototype: |
|---|
| Os_Rtn_E os_initThreadGroup( Os_Handle_T handle ); |

| Parameters: | |
|---|---|
| Handle | OS Handle, identifying the Thread Group. |

| Returns: | |
|---|---|
| OS_RTN_OK | Successful. |
| OS_RTN_BAD_PARAM | Invalid Thread Group handle. |

The start entry point starts all SyncThreads within an operating environment thread group. This call may only be called after the group has been synchronized. This call allows each SyncThread within the group to enter its "Main Loop" function, which occurs based on the priority of each thread. This call does not wait for the SyncThreads to execute. It just makes them schedulable by the underlying OS, and returns.

| Prototype: |
|---|
| Os_Rtn_E os_startThreadGroup( Os_Handle_T handle ); |

| Parameters: | |
|---|---|
| handle | OS Handle, identifying the Thread Group. |

| Returns: | |
|---|---|
| OS_RTN_OK | Successful. |
| OS_RTN_BAD_PARAM | Invalid event handle. |

A Message is a thread synchronization element, allowing a thread to signal another thread with both control and data. They must be used in tandem with message queues. Specifically, a thread can allocate a message, populate it with data, and transfer it to another thread by "putting" the message on a message queue. Messages may cross the processor boundary.

Messages may contain any combination of data types: by value for which the data is contained directly in the message and by reference for which pointers to data is in the message.

Pointers within messages are used carefully. Pointers will not translate across processor boundaries. Also, if a message must be destroyed internally within OS abstraction layer 122, the OS layer 122 cannot not free data blocks passed by reference within the deleted message. They must be managed externally by the client to prevent leaks. As such, passing data by reference (via pointer) within a message should be avoided.

The allocate entry point allocates a single message. It returns a void * pointer to the caller, referring to the memory block representing the message. The size of this block equals the required message size (plus a small message header, hidden from the client). After allocating a message, the client may populate the memory block with data.

| Prototype: |
|---|
| Os_Rtn_E os_allocMsg( Uint32 size, void **msg_pp ); |

| Parameters: | |
|---|---|
| Size | Size to allocate for this message. |
| **msg_pp | Pointer to return a void * pointer, referring to the allocated message. |

| Returns: | |
|---|---|
| OS_RTN_OK | Successful. |
| OS_RTN_BAD_PARAM | Invalid size. |
| OS_RTN_MEM_ERROR | Insufficient memory available to satisfy this request. |

The free entry point frees or de-allocates a single message.

| Prototype: |
|---|
| Os_Rtn_E os_freeMsg( void *msg_p ); |

| Parameters: | |
|---|---|
| *msg_p | Pointer to the message. |

| Returns: | |
|---|---|
| OS_RTN_OK | Successful. |
| OS_RTN_BAD_PARAM | Invalid message pointer. Pointer does not refer to a valid message. |

A message queue coordinates the transfer of messages between threads. A message queue manages messages on a "first-in/first-out" basis. An "owning" thread creates the message queue. After which, external clients or "using" threads may open and put messages onto the queue. Only the "owning" thread should retrieve or pull messages from the queue.

Message queues are independent of the system processor/communication processor boundary. Simply, "using" threads may open and put messages on both local (on same CPU) and remote messages queues, transparently.

Each message queue is uniquely identified by a globally visible queue identified ID. A queue identifier that uniquely specifies a single message queue. Queue IDs span the entire software system: all processors, and all software components.

typedef Uint32 Os_Qid_T;

Message priority level (Os_MsgPriority_E) represents the relative priority assigned to a Message. A preferred relative priority is per table 5.

TABLE 5

| | |
|---|---|
| OS_MSG_PRIORITY_LEVEL0 | Highest priority level. |
| OS_MSG_PRIORITY_LEVEL1 | . |
| OS_MSG_PRIORITY_LEVEL2 | . |
| OS_MSG_PRIORITY_LEVEL3 | . |
| OS_MSG_PRIORITY_LEVEL4 | . |

TABLE 5-continued

| | |
|---|---|
| OS_MSG_PRIORITY_LEVEL5 | . |
| OS_MSG_PRIORITY_LEVEL6 | . |
| OS_MSG_PRIORITY_LEVEL7 | Lowest priority level. |

The create entry point creates an operating environment message queue based on the requested size, allocating all required underlying OS resources. The caller provides a reference to a handle. This call populates the handle reference with a unique value, identifying the created message queue.

| Prototype: |
|---|
| Os_Rtn_E os_createMsgQ( Os_Handle_T *handle_p, Os_Qid_T qid, Uint32 size ); |

| Parameters: | |
|---|---|
| *handle_p | Message Queue Handle, filled in by this call on successful creation |
| Qid | Identifier uniquely specifying this Message Queue. |
| Size | Size of the requested queue: maximum number of messages. |

| Returns: | |
|---|---|
| OS_RTN_OK | Successful creation. |
| OS_RTN_ID_EXISTS | Message Queue for the input QID already exists. |
| OS_RTN_BAD_PARAM | Bad input parameter detected. |
| OS_RTN_MEM_ERROR | Failed to allocate required memory. |
| OS_RTN_ERROR | Failed to allocate underlying OS resources. |

The destroy entry point destroys or deletes an operating environment message queue, releasing all allocated underlying OS resources. This operation, also, deletes or frees all messages currently queued. After this call, the message queue handle is invalid and is no longer utilized.

| Prototype: |
|---|
| Os_Rtn_E os_destroyThread( Os_Handle_T handle ); |

| Parameters: | |
|---|---|
| handle | OS Handle, identifying the Message Queue. |

The open entry point opens an operating environment message queue. This call binds a "user" thread to a message queue instance, allowing it to transfer messages to the "owning" thread via the queue. The caller provided a reference to a handle. This call will populate this reference with a unique handle, binding the requested Message Queue.

| Prototype: |
|---|
| Os_Rtn_E os_openMsgQ( Os_Handle_T *handle_p, Os_Qid_T qid ); |

| Parameters: | |
|---|---|
| *handle_p | Message Queue Handle, filled in by this call on successful creation. |
| Qid | Identifier uniquely specifying the Message Queue to open or bind. |

| Returns: | |
|---|---|
| OS_RTN_OK | Successful creation. |
| OS_RTN_NOT_FOUND | Invalid Queue ID, a Message Queue does not exist for this ID. |
| OS_RTN_ERROR | General error, failed to bind the Message Queue. |

The close entry point closes an operating environment message queue. This call un-binds a "user" thread and a message queue. After this call, the message queue handle is invalid and is no longer utilized. Any message queue API call performed with a closed handle produces undefined behavior.

| Prototype: |
|---|
| Os_Rtn_E os_closeMsgQ( Os_Handle_T handle ); |

| Parameters: | |
|---|---|
| handle | OS Handle, identifying the Message Queue. |

| Returns: | |
|---|---|
| OS_RTN_OK | Successful close or un-bind. |
| OS_RTN_BAD_PARAM | Invalid Message Queue handle. |

The put entry point puts a message in an operating environment message queue. The message is placed in the message queue based on its priority. If the "owning" thread is blocked on the message queue, it will wake and receive the message. If the message is successfully queued, the message queue owns the message until it is "pulled" from the queue.

| Prototype: |
|---|
| Os_Rtn_E os_putMsgQ( Os_Handle_T handle, Os_MsgPriority_E priority, void **msg_pp ) |

| Parameters: | |
|---|---|
| handle | OS Handle, identifying the Message Queue. |
| priority | Priority to assign to the input message. Message placed in the queue based on this priority. |
| **msg_pp | Reference to a message pointer. If the message is queued successfully, the message pointer is NULLed. |

| Returns: | |
|---|---|
| OS_RTN_OK | Successful, Message on the tail of the queue. |
| OS_RTN_BAD_PARAM | Invalid Message Queue handle, or message pointer. |
| OS_RTN_QUEUE_FULL | Message Queue is full, could not put the message on the queue. |

The put after time entry point puts a message on an operating environment message queue after the indicated time delay. The message is placed at the back or tail of the message queue after the delay period expires. This operation provides the requester with a Cancel ID. The requestor may use the Cancel ID to terminate the put operation up until the delay period expires.

If this operation successfully sets up the requested delay, the message queue owns the message until it is "pulled" from the queue. If an error occurs "putting" the message after the delay, the message is deleted or freed.

| Prototype: |
|---|
| Os_Rtn_E os_putAfterMsgQ( Os_Handle_T handle, Os_TimeMS_T delay, Os_MsgPriority_E priority, void **msg_pp, Os_CancelId_T *cancelId_p ); |

| Parameters: | |
|---|---|
| handle | OS Handle, identifying the Message Queue. |
| delayMS | Delay in milliseconds. Message will be "Put" after this delay period. |
| priority | Priority to assign to the input message. Message placed in the queue based on this priority, when the delay expires. |
| **msg_pp | Reference to a message pointer. If the Put After Time is set-up successfully, the message pointer is NULLed. |

| Returns: | |
|---|---|
| OS_RTN_RTN_OK | Successful deletion. |
| OS_RTN_BAD_PARAM | Invalid Message Queue handle. |

-continued

Parameters:

| | |
|---|---|
| *cancelId_p | Cancel ID, returned to the caller. This ID may be used to cancel or terminate this operation. |

Returns:

| | |
|---|---|
| OS_RTN_OK | Successful, Message will be "Put" after the requested delay. |
| OS_RTN_BAD_PARAM | Invalid Message Queue handle, or message pointer |

The cancel after time entry point cancels or terminates a put after time request. The caller requests the cancel using the Cancel ID. This call deletes or frees the Message tied to the put after time request.

Prototype:

```
Os_Rtn_E
os_cancelPutAfterMsgQ( Os_CancelId_T cancelId );
```

Parameters:

| | |
|---|---|
| cancelId | Identifier specifying the Put After Time request to cancel or terminate. |

Returns:

| | |
|---|---|
| OS_RTN_OK | Successful, Put After Time terminated, and Message deleted. |
| OS_RTN_NOT_FOUND | Invalid Cancel ID. A Put After Time request was not found for this ID. This is either an invalid request, or the Put After Time operation has already completed. |

The wait entry point blocks or waits on a message queue until a message appears. If messages are queued when invoked, this call returns the message from the head of the queue immediately. Otherwise, this call blocks the calling thread until a put, or put after time expires. At that time, wait returns the "put" message to the caller. On success, the message ownership is transferred to the caller. The message queue owner, specifically the thread who created the message queue, may only invoke this call.

Prototype:

```
Os_Rtn_E
os_waitMsgQ( Os_Handle_T handle,
             void          **msg_pp );
```

Parameters:

| | |
|---|---|
| handle | OS Handle, identifying the Message Queue. |
| **msg_pp | Reference to a message pointer. Filled in with a Message on success. |

Returns:

| | |
|---|---|
| OS_RTN_OK | Successful, Message pulled from the Message Queue (msg_pp valid). |
| OS_RTN_BAD_PARAM | Invalid Message Queue handle. |

The get entry point pulls a message from a message queue, if present. If at least one message is queued, this call returns the message from the head of the queue immediately. Otherwise, this call returns queue empty status. On success, the message ownership is transferred to the caller. The message queue owner, specifically the thread who created the message queue, should only invoke this call.

Prototype:

```
Os_Rtn_E
os_getMsgQ ( Os_Handle_T handle,
             void          **msg_pp );
```

Parameters:

| | |
|---|---|
| handle | OS Handle, identifying the Message Queue. |
| **msg_pp | Reference to a message pointer. Filled in with a Message on success. |

Returns:

| | |
|---|---|
| OS_RTN_OK | Successful, Message pulled from the Message Queue (msg_pp valid). |
| OS_RTN_BAD_PARAM | Invalid Message Queue handle. |
| OS_RTN_QUEUE_EMPTY | Message Queue is empty. |

A Communication Buffer is a thread synchronization element, allowing a thread to pass a data block or packet to another thread. Communication buffers are explicitly provided to support the movement of large data packets through the system. Communication buffers only contain raw data. Buffers do not contain data types, which reference other buffers or data blocks.

The allocate entry point allocates a single communication buffer. It returns a void * pointer to the caller, referring to the buffer. The buffer is allocated based on the size parameter. After allocating a buffer, the client may populate the buffer with data.

Prototype:

```
Os_Rtn_E
os_allocCommBuff( Uint32 size,
                  void **buff_pp );
```

| Parameters: | |
|---|---|
| Size | Size to allocate for this buffer. |
| **buff_pp | Pointer to return a void * pointer, referring to the allocated buffer. buff_p points to the first client useable location within the buffer. |

| Returns: | |
|---|---|
| OS_RTN_OK | Successful. |
| OS_RTN_BAD_PARAM | Invalid size. |
| OS_RTN_MEM_ERROR | Insufficient memory available to satisfy this request. |

The free entry point frees or de-allocates a single communication buffer.

| Prototype: |
|---|
| Os_Rtn_E os_freeCommBuff( void *buff_p ); |

| Parameters: | |
|---|---|
| *buff_p | Pointer to the buffer. |

| Returns: | |
|---|---|
| OS_RTN_OK | Successful. |
| OS_RTN_BAD_PARAM | Invalid buffer pointer. Pointer does not refer to a valid communication buffer. |

Communication FIFOs manage the transfer of data packets (communication buffers) between threads, including transparent data transfer across the processor boundary. This functionality is provided to support software components that must transfer large amounts of data (i.e. UMTS protocol stack PDUs).

An "owning" thread creates the FIFO. After which, external clients or "using" threads may open and put communication buffers onto the FIFO. Only the "owning" thread should retrieve or pull buffers from the FIFO. FIFOs are independent of the System Processor/Communication Processor boundary. Simply, "using" threads may open and use both local (same CPU) and remote FIFOs, transparently. Each FIFO is uniquely identified by a globally visible FIFO ID.

The FIFO ID Identifier uniquely specifies a single FIFO. FIFO IDs span the entire software system: all processors, and all software components.

typedef Uint32 Os_FifoId_T;

The create entry point creates an operating environment FIFO based on the requested size, allocating all required underlying OS resources.

The caller provides a reference to a handle. This call populates the handle reference with a unique value, identifying the created FIFO.

| Prototype: |
|---|
| Os_Rtn_E os_createFIFO( Os_Handle_T *handle_p, Os_FifoId_T fifoId, Uint32 size ); |

| Parameters: | |
|---|---|
| *handle_p | FIFO Handle, filled in by this call on successful creation |
| fifoId | Identifier uniquely specifying this FIFO. |
| size | Size of the requested FIFO: number of buffers that the FIFO can manage. |

| Returns: | |
|---|---|
| OS_RTN_OK | Successful creation. |
| OS_RTN_BAD_PARAM | Bad input parameter detected. |
| OS_RTN_MEM_ERROR | Failed to allocate required memory. |
| OS_RTN_ERROR | Failed to allocate underlying OS resources. |

The destroy entry point destroys or deletes an operating environment FIFO, releasing all allocated underlying OS resources. This operation, also, deletes or frees all communication buffers currently stored in the FIFO. After this call, the FIFO handle is invalid and is no longer utilized.

| Prototype: |
|---|
| Os_Rtn_E os_destroyFIFO( Os_Handle_T handle ) |

| Parameters: | |
|---|---|
| handle | OS Handle, identifying the FIFO. |

| Returns: | |
|---|---|
| OS_RTN_OK | Successful deletion. |
| OS_RTN_BAD_PARAM | Invalid FIFO handle. |

The open entry point opens an operating environment FIFO. This call binds a "user" thread to a FIFO instance, allowing it to transfer communication buffers to the "owner" thread via the FIFO. The caller provides a reference to a handle. This call populates this reference with a unique handle, binding the requested FIFO.

| Prototype: |
|---|
| Os_Rtn_E os_openFIFO( Os_Handle_T *handle_p, Os_FifoId_T fifoId ); |

| Parameters: | |
|---|---|
| *handle_p | FIFO Handle, filled in by this call on successful creation. |
| fifoId | Identifier uniquely specifying the FIFO to open or bind. |

| Returns: | |
|---|---|
| OS_RTN_OK | Successful creation. |
| OS_RTN_NOT_FOUND | Invalid FIFO ID, a FIFO does not exist for this ID. |
| OS_RTN_ERROR | General error, failed to bind the FIFO. |

The close entry point closes an operating environment FIFO. This call un-binds a "user" thread and a FIFO. After this call, the FIFO handle is invalid and is no longer utilized. Any FIFO API call performed with a closed handle produces undefined behavior.

| Prototype: |
|---|
| Os_Rtn_E os_closeFIFO( Os_Handle_T handle ); |

| Parameters: | |
|---|---|
| handle | OS Handle, identifying the FIFO. |

| Returns: | |
|---|---|
| OS_RTN_OK | Successful close or un-bind. |
| OS_RTN_BAD_PARAM | Invalid FIFO handle. |

The put entry point puts a communication buffer into an operating environment FIFO. The buffer is placed at the back or tail of the FIFO. If this operation is successful, the FIFO owns the communication buffer until it is "pulled" from the FIFO.

| Prototype: |
|---|
| Os_Rtn_E os_putFIFO( Os_Handle_T handle, void **buff_pp, Uint32 size ); |

| Parameters: | |
|---|---|
| handle | OS Handle, identifying the FIFO. |
| **buff_pp | Reference to a communication buffer. If the buffer is successfully placed on the FIFO, the buffer pointer is NULLed. |
| size | Size of the buffer in bytes. |

| Returns: | |
|---|---|
| OS_RTN_OK | Successful, buffer placed at the end or tail of the FIFO. |
| OS_RTN_MEM_ERROR | Failed to allocate required memory. |
| OS_RTN_QUEUE_FULL | FIFO is full, could not put the buffer in the FIFO. |

The wait entry point blocks or waits on a FIFO until a communication buffer appears in the FIFO. If the FIFO contains a buffer, this call pulls the buffer and returns the buffer immediately. Otherwise, this call blocks the calling thread until a buffer is "put" in the FIFO. At that time, Wait returns the communication buffer to the caller. On success, the communication buffer ownership is transferred to the caller. The FIFO owner, specifically the thread who created the FIFO, should only invoke this call.

| Prototype: |
|---|
| Os_Rtn_E os_waitFIFO( Os_Handle_T handle, void **buff_pp, Uint32 *size_p ); |

| Parameters: | |
|---|---|
| handle | OS Handle, identifying the FIFO. |
| **buf_pp | Reference to a buffer pointer. Filled in with a buffer pointer on success. |
| *size_p | Buffer size. Filled in with the buffer size on success. |

| Returns: | |
|---|---|
| OS_RTN_OK | Successful, buffer pulled from the FIFO (buff_pp and size_p valid). |
| OS_RTN_BAD_PARAM | Invalid FIFO handle. |

The get entry point pulls a communication buffer from a FIFO, if present. Otherwise, this call returns FIFO empty status. On success, the buffer ownership is transferred to the caller. The FIFO owner, specifically the thread who created the FIFO, should only invoke this call.

| Prototype: |
|---|
| Os_Rtn_E os_getFIFO( Os_Handle_T handle, void **buff_pp, Uint32 *size_p ); |

| Parameters: | |
|---|---|
| handle | OS Handle, identifying the FIFO. |
| **buff_pp | Reference to a buffer pointer. Filled in with a buffer pointer on success. |
| *size_p | Buffer size. Filled in with the buffer size on success. |

| Returns: | |
|---|---|
| OS_RTN_OK | Successful, buffer pulled from the FIFO (buff_pp and size_p valid). |
| OS_RTN_BAD_PARAM | Invalid FIFO handle. |
| OS_RTN_QUEUE_EMPTY | FIFO is empty. |

The OS API provides a generic link list implementation with iterator functionality. This feature is provided so that link lists are utilized via a common mechanism throughout the system.

The create entry point creates an empty list with iterator referring the list end (i.e. NULL element terminating the list). The caller provides a reference to a handle. This call will populate the handle reference with a unique value, identifying the created list.

| Prototype: |
|---|
| Os_Rtn_E os_createList(Os_Handle_T *handle_p); |

| Parameters: | |
|---|---|
| *handle_p | List Handle, filled in by this call on successful creation |

| Returns: | |
|---|---|
| OS_RTN_OK | Successful creation. |
| OS_RTN_MEM_ERROR | Failed to allocate required memory. |
| OS_RTN_ERROR | Failed to allocate underlying OS resources. |

The destroy entry point destroys a list and its iterator. The client empties the list prior to destroying it. Otherwise, all elements remaining in the list are leaked, if they are not managed external to the list. After this call, the list handle is invalid and is no longer utilized.

| Prototype: |
|---|
| Os_Rtn_E os_destroyList ( Os_Handle_T handle ) |

| Parameters: | |
|---|---|
| handle | OS Handle, identifying the List. |

| Returns: | |
|---|---|
| OS_RTN_OK | Successful deletion. |
| OS_RTN_BAD_PARAM | Invalid List handle. |

The append element entry point appends an element to the end of the list with the following special conditions:
  If the list was empty, its iterator will now point to this element at the head.
  If the iterator had advanced past the end of the list, it will now point to the new entry at the tail.

| Prototype: |
|---|
| Os_Rtn_E os_appendList( Os_Handle_T handle, void *item_p); |

| Parameters: | |
|---|---|
| Handle | OS Handle, identifying the List. |
| *item_p | Element to place in the list, reference via a void pointer. |

| Returns: | |
|---|---|
| OS_RTN_OK | Successful deletion. |
| OS_RTN_BAD_PARAM | Invalid List handle. |
| OS_RTN_MEM_ERROR | Failed to allocate memory required to add the element to the list. |

The insert element before iterator entry point adds an element to the list in front of its iterator, with the following special conditions:
  If the list was empty, the element will be placed at the head, and the iterator will refer to the list end (i.e. NULL element terminating the list).
  If the iterator had advanced past the end of the list, the element will be added at the tail, and the iterator will remain referring to the list end (i.e. NULL element terminating the list).

| Prototype: |
|---|
| Os_Rtn_E os_insertBeforeIterator( Os_Handle_T handle, void *item_p); |

| Parameters: | |
|---|---|
| handle | OS Handle, identifying the List. |
| *item_p | Element to place in the list, reference via a void pointer. |

| Returns: | |
|---|---|
| OS_RTN_OK | Successful deletion. |
| OS_RTN_BAD_PARAM | Invalid List handle. |
| OS_RTN_MEM_ERROR | Failed to allocate memory required to add the element to the list. |

The insert element after iterator entry point adds an element to the list in back of its iterator, with the following Special conditions:
   If the list was empty, this request is rejected with OS_RTN_END_OF_LIST status.
   If the iterator had advanced past the end of the list, this request is rejected with OS_RTN_END_OF_LIST status.

| Prototype: |
| --- |
| Os_Rtn_E<br>os_insertAfterIterator( Os_Handle_T handle,<br>                                void           *item_p); |

| Parameters: | |
| --- | --- |
| handle | OS Handle, identifying the List. |
| *item_p | Element to place in the list, reference via a void pointer. |

| Returns: | |
| --- | --- |
| OS_RTN_OK | Successful deletion. |
| OS_RTN_END_OF_LIST | Iterator has advanced past the end of the list, cannot insert after it. |
| OS_RTN_BAD_PARAM | Invalid List handle. |
| OS_RTN_MEM_ERROR | Failed to allocate memory required to add the element to the list. |

The get element at iterator entry point returns a reference to the element located at the list iterator. The element is not removed from the list, with the following special conditions:
   If the list is empty, this call returns NULL.
   If the iterator has advanced past the end of the list, this call returns NULL.

| Prototype: |
| --- |
| void*<br>os_getIteratorItem(Os_Handle_T handle); |

| Parameters: | |
| --- | --- |
| handle | OS Handle, identifying the List. |

| Returns: | |
| --- | --- |
| NULL | Invalid List, Empty List, or Empty Iterator. |
| Otherwise | Reference to the element located at the Iterator. |

The remove element at iterator entry point removes the element located at the list iterator. The element is returned to the caller with the following special conditions:
   If the list is empty, this call returns NULL.
   If the iterator has advanced past the end of the list, this call returns NULL.

| Prototype: |
| --- |
| void*<br>os_removeIteratorItem(Os_Handle_T handle); |

| Parameters: | |
| --- | --- |
| handle | OS Handle, identifying the List. |

| Returns: | |
| --- | --- |
| NULL | Invalid List, Empty List, or Empty Iterator. |
| Otherwise | Element pulled from the Iterator. |

The advanced iterator entry point advances the list iterator one position, with the special conditions:
   The iterator may advance off the end of the list successfully. However once the iterator reaches the end, further attempts to advance it will return: OS_RTN_END_OF_LIST.
   If the list is empty, this call returns OS_RTN_END_OF_LIST.

| Prototype: |
| --- |
| Os_Rtn_E<br>os_advanceIterator(Os_Handle_T handle); |

| Parameters: | |
| --- | --- |
| handle | OS Handle, identifying the List. |

| Returns: | |
| --- | --- |
| OS_RTN_OK | Iterator advanced to next element. |
| OS_RTN_END_OF_LIST | Cannot advance the iterator, it's at the end of the list. |
| OS_RTN_BAD_PARAM | Invalid List handle. |
| OS_RTN_END_OF_LIST | Iterator is at the end of the list. |

The reset iterator entry point resets the list iterator to the head or front of the list.

| Prototype: |
| --- |
| Os_Rtn_E<br>os_resetIterator(Os_Handle_T handle); |

| Parameters: | |
|---|---|
| handle | OS Handle, identifying the List. |

| Returns: | |
|---|---|
| OS_RTN_OK | Iterator advanced to next element. |
| OS_RTN_BAD_PARAM | Invalid List handle. |

The OS API 120 provides a generic hash table implementation. This feature provides a common hash table mechanism throughout the system. The API 120 preferably supports general dynamic memory allocation from the heap, although others may be used.

The allocate memory entry point allocates a block of memory from the general heap. Location of the general heap is OS dependent. This function exhibits the same behavior as the Standard IO call: malloc. It utilizes over malloc to support Operating System independence.

| Prototype: |
|---|
| void* <br> os_allocMem( Uint32 size ); |

| Parameters: | |
|---|---|
| size | Request memory block size. |

| Returns: | |
|---|---|
| NULL | Memory allocation error. |
| Otherwise | Reference to the allocated memory. |

The free memory entry point frees or de-allocates a block of memory back to the general heap. Location of the general heap is OS dependent. This function exhibits the same behavior as the Standard IO call: free. It must be utilized over free to support operating system independence. This call is used only with memory references returned from os_allocMem. Other input causes undefined behavior.

| Prototype: |
|---|
| void <br> os_freeMem( void *mem_p ); |

| Parameters: | |
|---|---|
| *mem_p | Pointer to memory block to free. |

Returns:
  None.

Other services not falling into the previous categories are as follows. The delay for milli-seconds entry point blocks the calling thread's execution for the indicated number of milli-seconds.

| Prototype: |
|---|
| Os_Rtn_E <br> os_delayMilliSec( Os_TimeMS_T milliseconds ); |

| Parameters: | |
|---|---|
| milliseconds | Delay period in milli-seconds |

| Returns: | |
|---|---|
| OS_RTN_OK | Delay period complete. |
| OS_RTN_ERROR | Could not execute the delay period. |

The get current time entry point returns the current free running D<HRT> time value (in milliseconds).

| Prototype: |
|---|
| Os_TimeMS_T <br> os_getTime( void ); |

Parameters:
  None.

| Returns: | |
|---|---|
| Os_TimeMS_T | Current time tick value in milliseconds. |

In the preferred embodiment, an SDL porting layer 110 is used. The preferred SDL porting layer allows for software modeled using a single threaded code generation tool to run as multi-threaded software. The most preferred application is to code generated using C-Micro light integration of Telelogic Tau. The SDL porting layer 110 effectively converts the light integration (single thread) to a tight integration (multiple threads). The most preferred application allows for reduced code footprint (C-micro, light integration) with the added benefits a multi-threaded environment.

In a typical single threaded operating environment, the variables are brought in as global variables. Since the variables operate in a single threat, there is only a need for global variables. To facilitate operating in a multi-threaded environment using single threaded modeling tools, the variables are brought in as parameters/by reference and not global variables. The transition functions are modified to allow this functionality. This functionality prevents one thread from stopping on another threads variable. This facilitates the use of parameter variables by independent threads. The preferred structure to facilitate this is described herein.

In other embodiments, the other tools can be used without the SDL porting layer. Additionally, aspects of the SDL porting layer can be used with other single thread code generation tools as well as multi-thread code generation tools other than C-micro.

The basic requirement of the porting layer 110 is to produce the same SDL system behavior as the SDT provided C-micro kernel. This includes the ability to support the following SDL model features (SDT-imposed restrictions in parentheses).

SDL Feature:
    Multiple processes
        Send-Via signals (no output via all)
        Send-To signals
        Deferred signals
        Multiple instances of a process (finite number only)
        Asterisk input, asterisk state
        Timers (integer duration only)
        Signal w/parameters (no omission of parameters in a signal input)
        Timer w/parameter (one integer parameter only)
        Dynamic process creation (no formal parameters)
        Procedure (no inheritance, no states, no nested procedure call data scope)
        Service
        Predefined Types
        (No RPC)
        (No Service and Priority Input and Output)
        (No Export/Import, View/Reveal)
        (No Enabling condition/Continuous signal)
        (No Any Expression)
        (No Macros)
        (No channel substructure)
        (Names of processes within different blocks must be different)

A number of options may be available during SDL code generation. The following description is based on the Make window in SDT to perform this step, although others may be used.

Figure 5B:
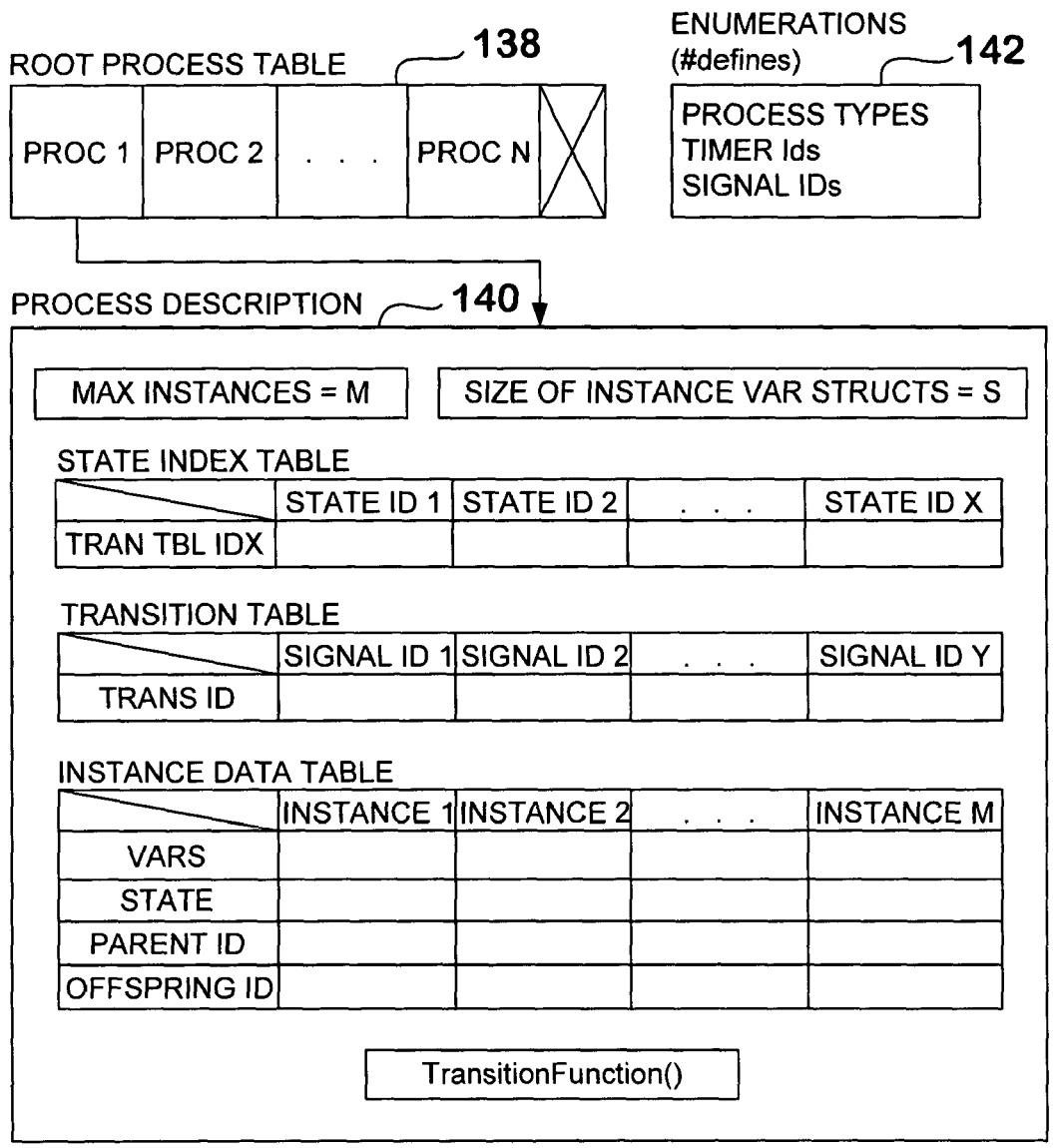
FIG. 5B is an illustration of the structure of SDL C-micro generated data types.

The options chosen for the preferred code generation are as follows, although others may be used.
    Analyze & generate code (only)
    Code generator: C-micro
    Prefix: Full
    Separation: Full
    Capitalization: As defined The code generated by SDT consists mainly of data structures. The only pieces that translate to operational code are the transition functions associated with each process. The structure of the generated data types is represented in FIG. 5B.

The root process table 138 is a global array, sized to the maximum number of process types in the system, plus one to allow for an end marker. This array is composed of process description block entries, one for each process type in the SDL system. The contents of each process description 140 are static variables, placed in the process's source file, along with the transition function. The root process table 138 is placed in the system source file.

The enumerations (process type and timer/signal IDs) are placed in header files 142. Process types are preferably numbered beginning at 0. To accommodate multiple instances of a single process type running in the system, an instance number is combined with the process type to come up with the process ID, or PID. Instance numbers begin at 0. Timer ID's and signal ID's share a common enumeration. Timers ID's are defined first, beginning at 1 (0 is reserved for the Start signal). FIG. 6 is a list of preferred reserved IDs.

An SDL system can be partitioned using either automatic or manual partitioning. Automatic partitioning is accomplished preferably via an SDT build script. When the system is partitioned, send-via signals that cross a partition's boundary get translated into signals that are sent-to an "environment" SDL process. The identity of the true intended recipient is lost. Enough information may be available in the SDT-generated PR file to construct a mapping table (signal ID+ sending process ID=destination process ID), which the environment process could use to forward the signals. However, this imposes more restrictions on the design of the system and adds extra hops to the signal's route.

Manual partitioning is done after code generation. A copy is made of the system source file, and the two are edited. The root process table entries for processes not in the partition are replaced with null entries. Next, the files are grouped according to partition and compiled using an appropriate make file. Full separation is required during the code generation step so that this grouping can occur. The main drawback to manual partitioning is the need to edit a generated code file. However, it produces more efficient code, and it does not impose limitations on the system.

For SDL system startup, each partition within the SDL system is compiled into a single executable (exact form is both OS and HW platform dependent). At startup, the partition's "main" (main thread) loops through the root process table 138. Each non-null entry represents a local process type. The process description 140 for each process type contains an instance data table, sized to the maximum number of instances of the type that can be running simultaneously in the system. A thread group is created, containing a synchronized thread for each possible process instance. A process control block is created for each instance, containing the process ID and a pointer to the process description. A pointer to the process control block is passed to the thread so that it has scoped access to its own information.

The thread group is directed to synchronize, then to start. During synchronization, each thread creates for itself a message queue, a save list, and an active timer list. The handles for these items are stored in the process control block. If a process instance should be active on startup, as dictated by the generated code, a thread then sends a Start signal to itself. At this point, initialization is complete, and the thread notifies the thread group accordingly. When all threads have checked in, the thread group can be started, and active instances will receive and process their Start signals.

Figure 7:
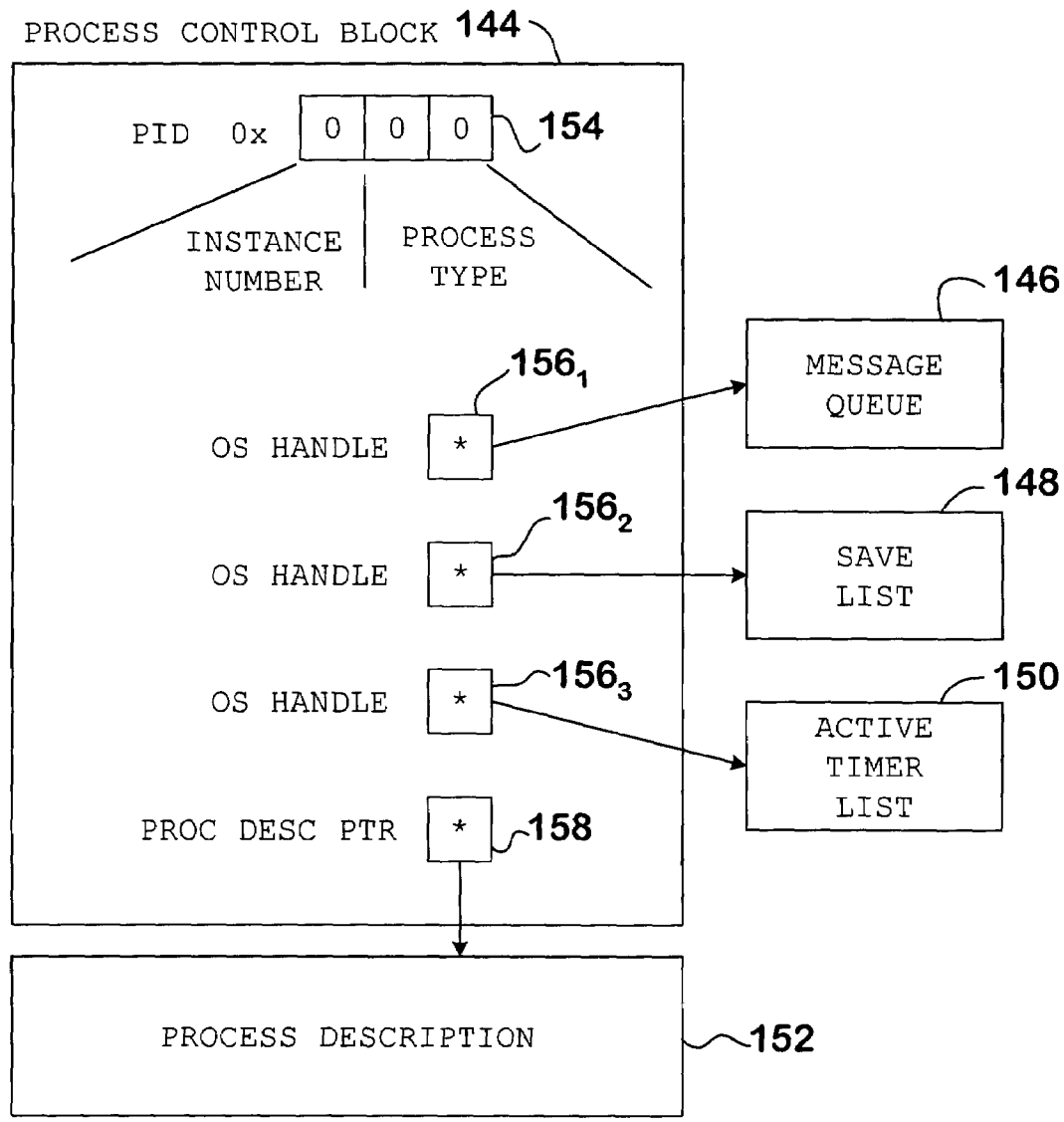
FIG. 7 illustrates the format of an SDL process control block.

FIG. 7 illustrates the format of a Process Control Block. The data type and its associated table are extensions to C-Micro to support tight integration to the OS API. The process control block 144 has a PID 154, OS handles $156_1$ to $156_3$ and a process description pointer 158. One OS handle $156_1$ points to a message queue. Another OS handle points to a save list 148 and another $156_3$ to an active timer list 150. The process description pointer 158 points to a process description 152.

For SDL signal inputs, each SDL process instance runs in its own operating environment thread. Its responsibility is to receive and react to signals. Signals are received in messages through the thread's associated message queue. There are three ways an SDL process may react to a signal: discard it, save it for later, or initiate a state transition.

Once a signal has been identified as the current signal, the SDL process decides how to react to it. The framework for processing a signal resides in the porting layer and uses data accessed through the process control block 144. The following is the processing of the signal.

Figure 8:
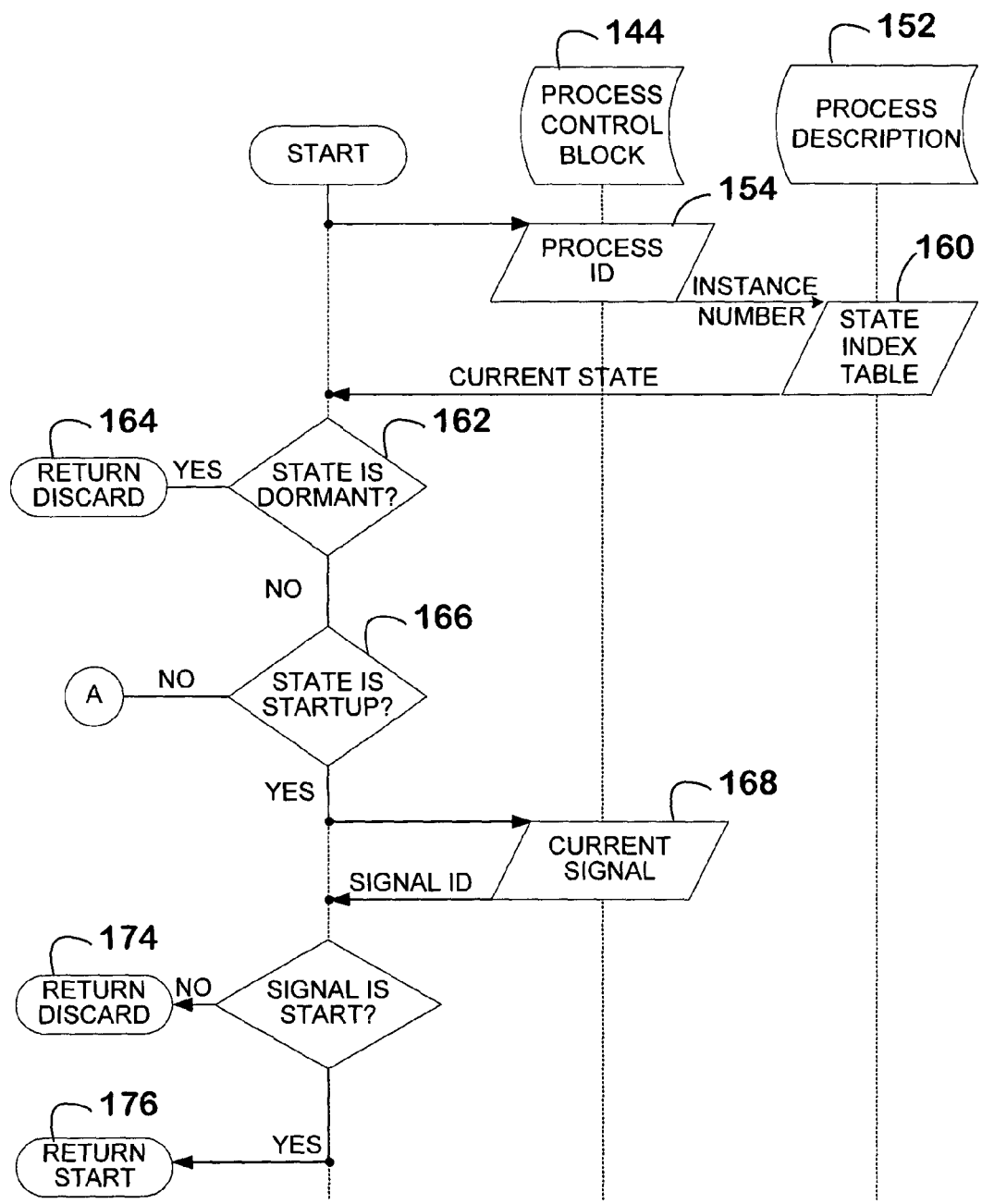
FIGS. 8, 9 and 10 are flow charts of a signal identity translated into a transition identity within the SDL porting layer.
Figure 9:
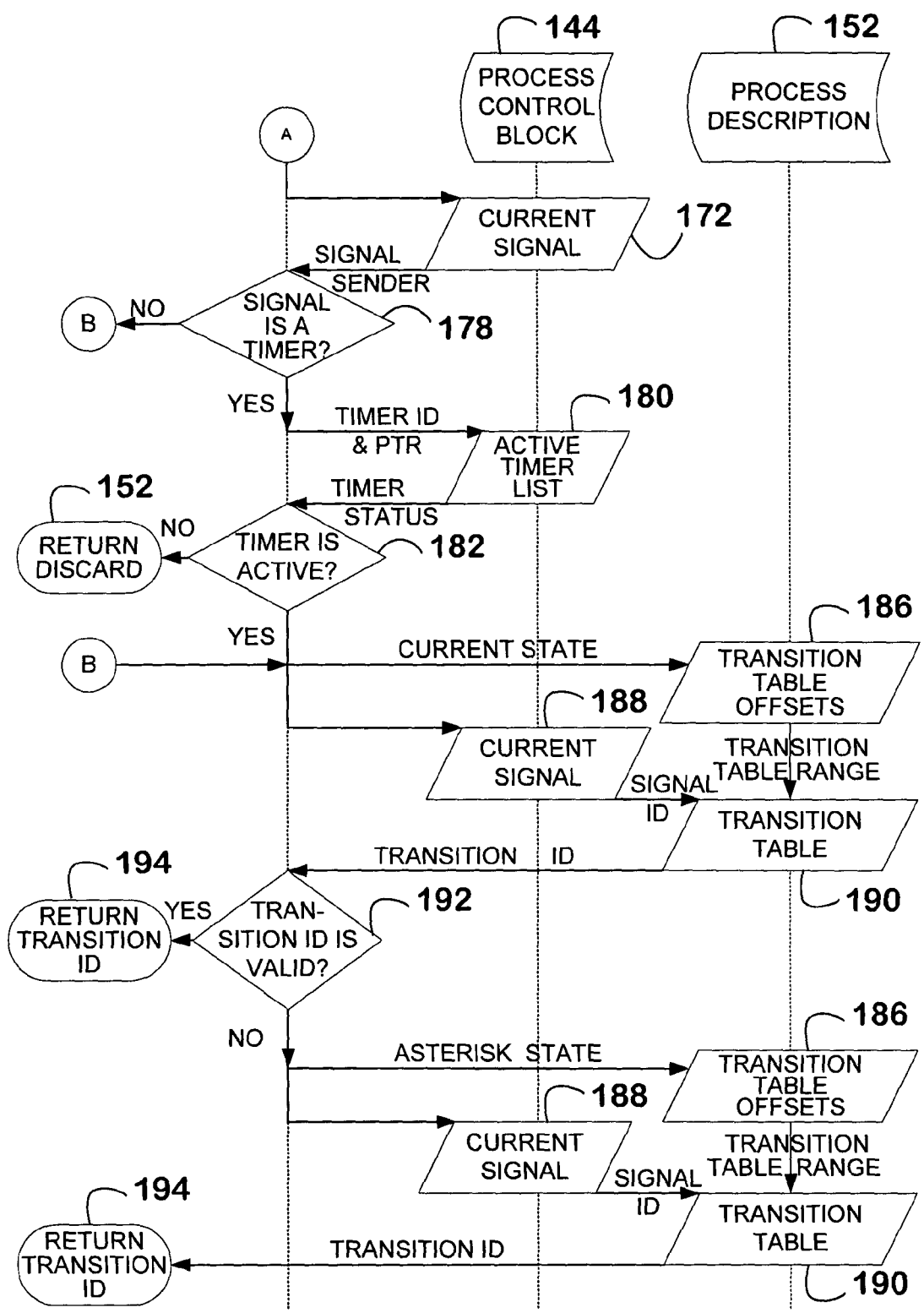
Figure 10:
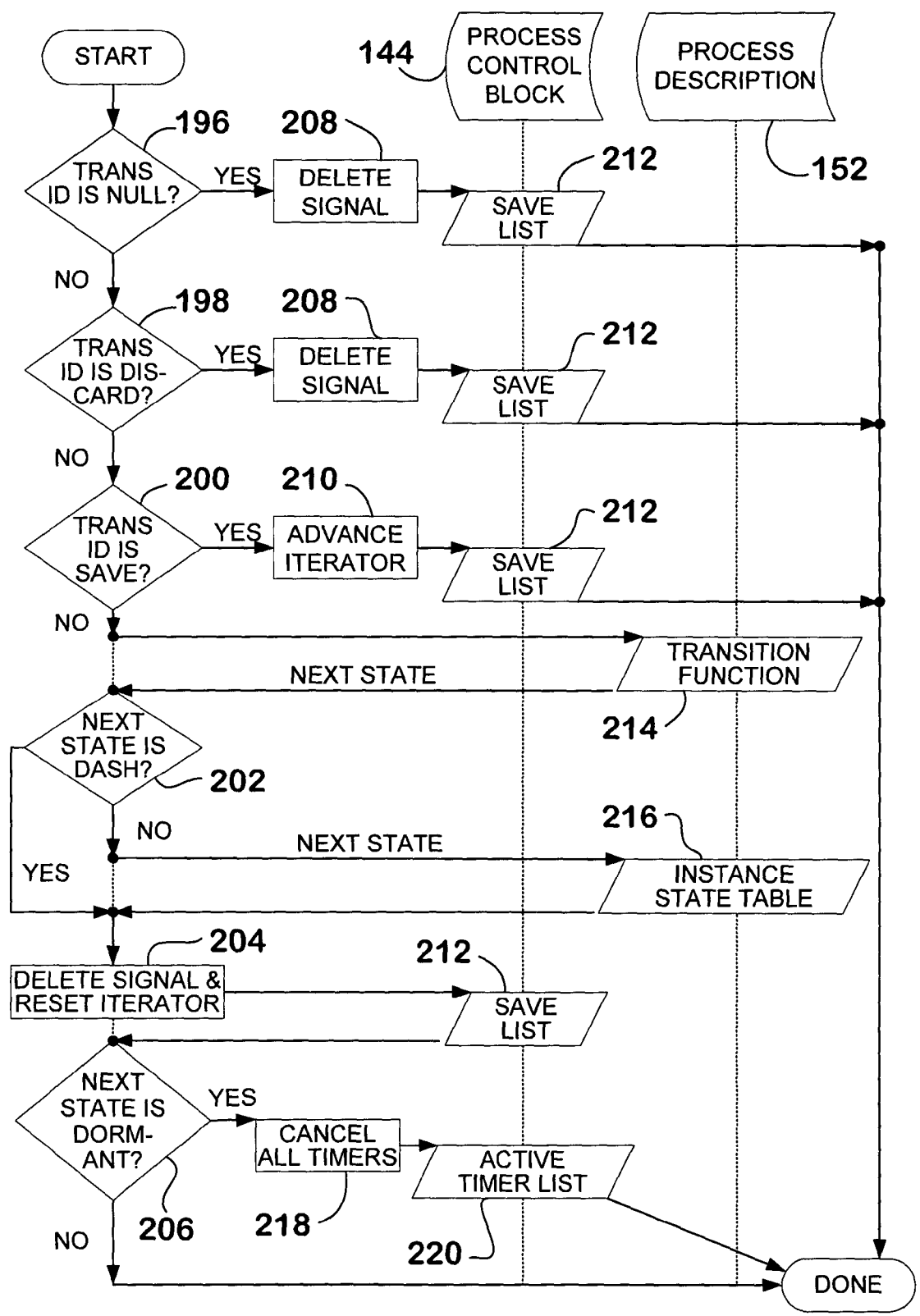

As illustrated in the flow chart of FIGS. 8, 9 and 10, the signal ID is translated into a transition ID. The process ID 154, stored in the process control block 144, provides the instance number. The instance number is used to index into the state index table 160 in the process description 152, and finds the current state. If the current state is Dormant 162, the transition ID is set to discard 164. If the current state is Start and the signal ID is Start, 166, 170, the transition ID is set to Start and the process returns to Start, 176. Any other signal received while in the Start state results in a transition ID of Discard, 174.

If the current state is neither Dormant nor Start, the signal is checked to see if it represents a timer, 178. When a timer is set, the sender ID of the signal is set to a reserved Timer process value, and an entry is added to the active timer list 180. If a timer is cancelled, its entry is removed from the list. If a signal 172 is received whose sender has been set to the reserved Timer process value, it is identified as a timer signal. If an entry for that timer is found on the active list 180, 182, the entry is removed and processing continues. If it is not found, the timer is invalid, and the transition ID is set to Discard, 184.

If the transition ID has not yet been set, the expected signals 188 for the current state are checked. In the state index table, each state maps to an index into the transition table, 190, where the signals expected in that state begin. The transition table entries are state-ordered the same as the state index table, so by also using the subsequent state's index, a range of indices into the Transition Table 190 is obtained. Within this range, if a signal ID is found that matches the current signal 188, or if the Asterisk signal ID is defined for this state, the corresponding transition ID is taken, 194.

If a valid transition ID has still not been found, the Asterisk State is checked. If the Asterisk State is defined for this process, the first entry in the state index table is not a 0, since the Asterisk state entries in the transition table come first. Therefore, this bottom range is checked the same as the current state.

If the transition ID is Discard, 198, or if all attempts to obtain a valid transition ID fail, a Null, (the signal is unexpected), the signal is discarded, 208. If the transition ID is "Save", 200, the signal is saved via advance itorator 210, (on the save list 212). All other transition ID's are fed into the process description's transition function 214, the behavior of which is defined in SDL, and a new state ID is returned.

If the new state is not Dash, 202, the instance state table 216 is updated to the new state. If the new state is Dormant, 206, all active timers are cancelled, 218, 220. The save list 212 and the message queue are not flushed, 204, but are handled through normal processing. If the process is quickly started again, this may result in stale signals reaching the new process (since Start signals are sent with High priority and could jump ahead of stale signals in the queue). However, this is preferable to mistakenly discarding signals intended for the new process.

For signal output, SDL processes send signals from within the transition function. A connection is acquired to the destination message queue. Since opening and closing a connection to a message queue each time a message is put on it is undesirable, connections are opened as needed, and kept in a shared area for all threads in the process to use until system shutdown. This is accomplished via a lookup function, provided by the OS abstraction layer 122.

Timers can be set by an SDL process. When a timer goes off, it is received and processed as a signal. An SDL process can also cancel timers. Once a timer has been cancelled, it should not appear on the incoming message queue.

A high-level design description of the OS abstraction layer is as follows. The OS abstraction layer implements the OS API, providing clients with the operating environment.

Figure 11A:
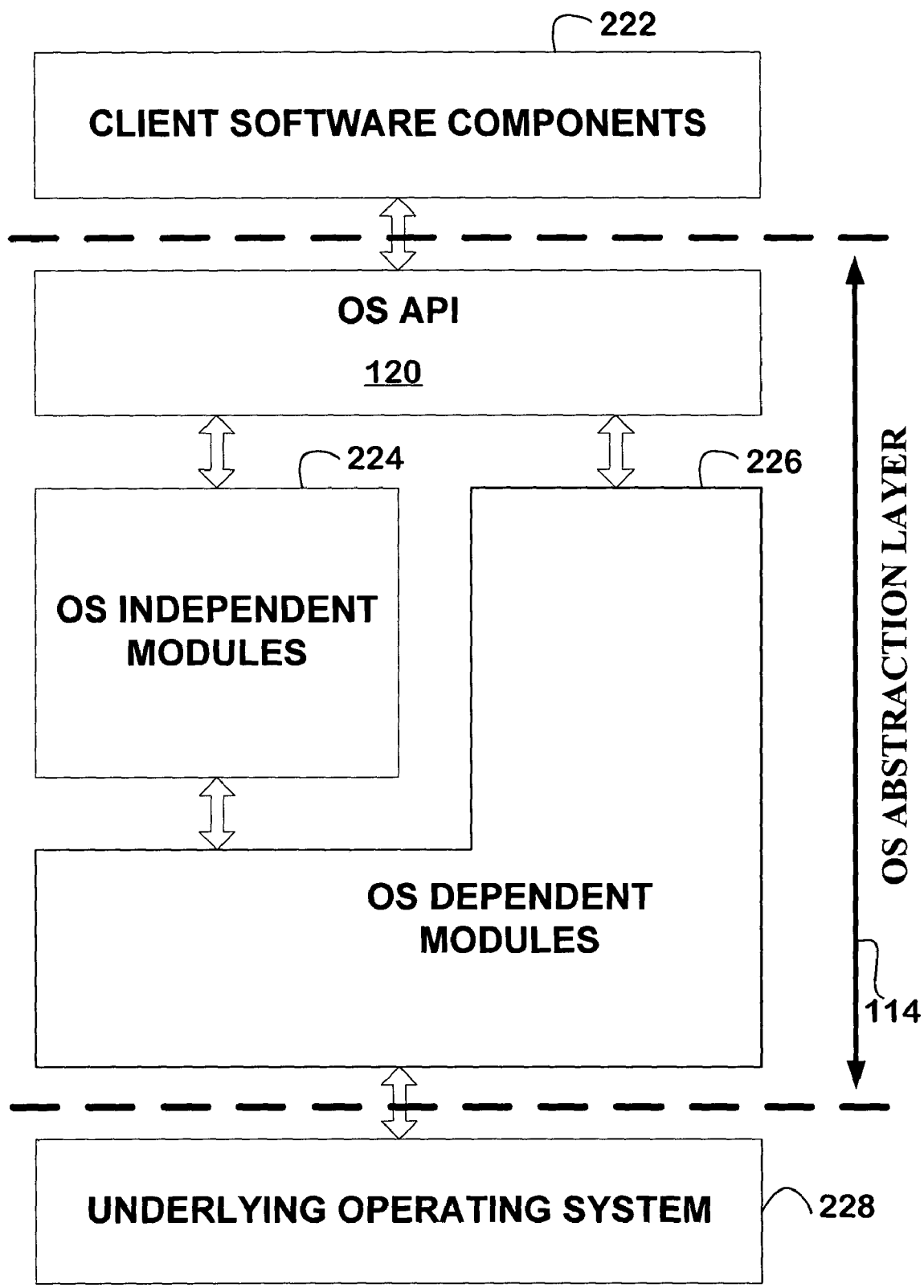
FIG. 11A is a high-level illustration of the OS abstraction layer.

FIG. 11A provides a high-level illustration of the OS abstraction layer 114. One of the functions of the OS abstraction layer 114 is to map operating environment entities to the underlying OS, such as a system OS or a communication OS. The OS abstraction layer allows for the operating environment to operate independently of the underlying OS platforms or hardware structure. As a result, code generated for use in one underlying OS/hardware environment can be used in other environments by changes to or by changing the OS abstraction layer. As a result, the resources required to be provided to facilitate an OS/hardware platform change are reduced. Although the preferred OS abstraction layer 114 operates with the operating environment described herein, it can be applied to other environments, such as OSE or VS works.

The abstraction layer 114 provides the operating environment by implementing the OS API 120. Client software components 222 access the operating environment via the API 120, preferably by using a global IDC_OS_API.h header file.

The abstraction layer is divided into separate modules, based on OS constructs. Each module provides an implementation for a single construct. Complex construct implementations may utilize lower-level constructs to achieve their functionality.

These modules are either OS dependent modules 226 or OS independent modules 224. OS dependent modules 226 interface, directly, with the underlying OS 228. A separate implementation appears for each target operating system. OS independent modules 224 do not interface with the underlying OS 228. They either provide all required functionality without the OS, or utilize OS dependent constructs via the OS API 120. Their implementation may be used for any target operating system.

The mixture of dependent and independent modules 226, 224, utilized to create the OS abstraction layer 114, may be tailored based on the characteristics of each operating system, independently. Specifically, one implementation may use an OS independent module 224, and another may use a dependent module 226. For example, EPOC utilizes an independent message queue module. But, OSE uses a dependent message queue module in order to capitalize on the signaling strengths of OSE.

The following OS abstraction layer naming convention is preferably utilized to specify which modules are OS independent and which are OS dependent (including to which OS).

OS Independent Modules:

OS_<construct>.c

Prefix—All independent modules start with the "OS_" prefix.

Construct Name—<construct> field identifies the API construct that this module provides.

OS Dependent Modules:

<os>_<construct>.c

Prefix—<os>prefix field identifies which Operating System this module applies.

Construct Name—<construct> field identifies the API construct that this module provides.

The software structure for the OS abstraction layer 114 is relatively simple. The OS abstraction layer 114 contains a module for each OS construct specified in the API 120. These modules may be OS dependent 226 or OS independent 224 based on the characteristics of each target operating system.

The OS modules fall into one of two categories: simple, and complex or compound. Simple modules are self-contained. They provide all required functionality with little assistance from subordinate components. Complex or compound components either require a complex implementation, or require the use of subordinate components to achieve their desired functionality. These may be OS layer internal components, or standard OS constructs. Internal components are accessed via an OS independent internal interface. They provide common services required by several OS abstraction constructs, but they are not published in the OS API 120. Standard OS constructs utilized as subordinates are accessed via the OS API 120.

Figure 11B:
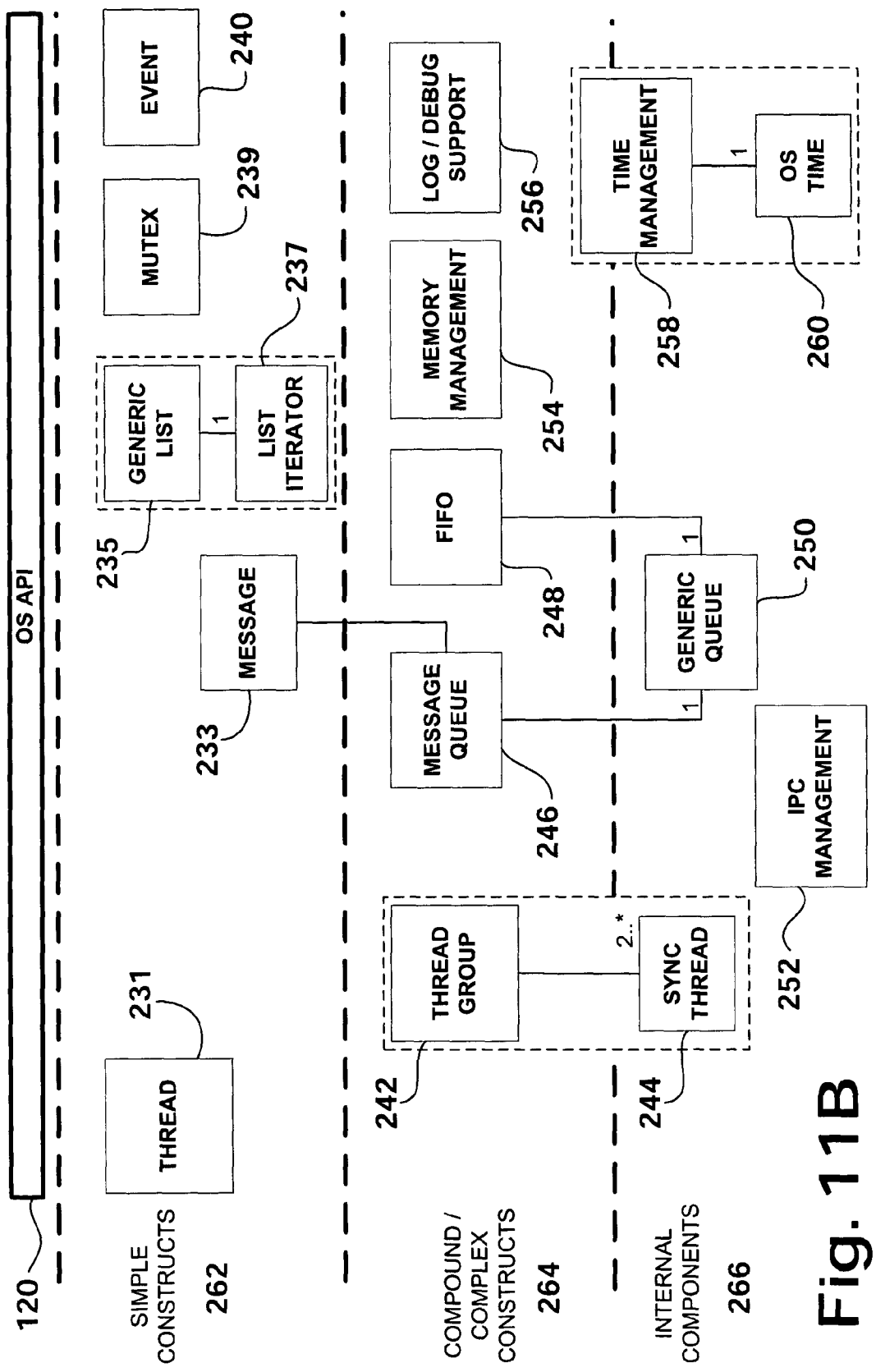
FIG. 11B is an illustration the OS API software structures.

FIG. 11B illustrates the OS API software structures. These structures are described in table 6.

TABLE 6

| Module: | Description: | File Name: |
|---|---|---|
| | Simplex 262 | |
| Mutex 239 | Implements a Mutex. | <os>_Mutex.* |
| Event 240 | Implements an Event. | <os>_Event.* |
| Thread 231 | Implements a Thread. | <os>_Thread.* |
| Message 233 | Implements the basic Message allocation and de-allocation services. | <os>_Message.* |
| Generic List 235 with Iterator 237 | Implements a generic link list, including a list iterator. | <os>_List.* |
| | Complex/Compound 264 | |
| Message Queue 246 | Implements a Message Queue. Message queues provide IPC capabilities, requiring two implementations (or sub-modules): local and remote. A local queue resides on same processor as its client. It includes all message queue capabilities. A remote queue provides a proxy for a queue located on the opposite processor. It provides only "user" capabilities (open, close, and put) via the IPC Management module. | <os>_MsgQ.* <os>_LocalMsgQ.* <os>_RemoteMsgQ.* |
| FIFO 248 | Implements a FIFO. FIFOs provide IPC capabilities, requiring two implementations (or sub-modules): local and remote. A local FIFO resides on same processor as its client. It includes all FIFO capabilities. A remote FIFO provides a proxy for a FIFO located on the opposite processor. It provides only "user" capabilities (open, close, and put) via the IPC Management module. | <os>_Fifo.* <os>_LocalFifo.* <os>_RemoteFifo.* |
| Thread Group 242 | Implements a Thread Group. A Thread Group manages a collection of Synchronized Threads. This module is OS independent, containing thread management functionality. It utilizes the OS dependent SyncThread module, providing a physical thread implementation within the context of the underlying OS. | <os>_ThreadGroup.* |
| Memory Management 254 | Provides all Memory Management capabilities. Note, this module will be expanded, and may be split into OS dependent and independent components. | <os>_Memory.* |
| Log/Debug Support 256 | Provides the error and debug reporting capabilities. Note, this module will be expanded, and may be split into OS dependent and independent components. | <os>_Log.* |
| | Internal 266 | |
| Time Management 258 and OS Time 260 | Provides all time-related functions. This module is a hybrid, providing both API services, and OS Abstraction services. API Services: time now, and delay. Internal Services: Set CallBack, Cancel CallBack. Note, this module is split into OS dependent and independent components. | OS_TimeMgr.c <os>_Time.* |
| IPC Management 252 | Provides all IPC functionality. Design is TBD. This module may be split into common, and OS specific modules. | <os>_IPC.* |
| Synchronized Thread 244 | Implementation of Synchronized Threads. Note, Thread Group's use this internal module exclusively. | <os>_SyncThread.* |
| Generic Queue 250 | Provides a generic queue implementation. Used to create more complex OS constructs. | <os>_Queue.* |

The OS constructs, regardless of being OS dependent 226 or independent 224, use the following design pattern. Control blocks store all information required to implement an OS construct within the OS abstraction layer. The control block always begins with a marker specific to the construct type. The marker serves two purposes. First, it is used as a defensive programming measure. Functions that accept a reference to a control block as input always verify the marker before accessing data within the block. Secondly, the markers can be used during debug. They allow control blocks to be easily identified in memory. Typically, control blocks are defined privately within their construct's source file, encapsulating their format and implementation. Control blocks are allocated and freed using dedicated functions. This allows their allocation mechanism to be isolated, and changed without effecting the core construct logic.

An OS handle is assigned to represent or id3entify a construct, when the OS layer creates the construct instance. The OS layer uses the address of the construct's control block as the handle value. When a client inputs a construct handle into an OS API call, the OS layer converts the handle into a pointer referencing the control block for that construct instance. There is no need to perform look-ups or searches. This maximizes performance with little cost to size, and makes the OS layer efficient.

OS constructs provide both a creation method, and a destruction method. The "Create" method allocates and populates the construct's control block, including creating subordinate objects. The "Destroy" method kills all subordinate objects, and frees the construct's control block.

OS constructs that include IPC capabilities provide open and close methods. These calls bind and unbind clients to construct instances regardless of where they reside in the software system. IPC capable constructs, also, require unique identifiers (Queue IDs, FIFO IDs, etc.).

As an implication, this feature introduces the concept of owners and users. An "owning" client creates and may destroy a construct instance. The construct allows its "owning" client access to its full feature set. A "using" client binds and unbinds to a single construct instance via open and close. Closing a construct does not destroy it. Additionally, a construct may restrict "using" clients, allowing them access to a sub-set of construct's features. For example, an owner can "wait on" and "put to" a message queue, but a user can only "put to" the queue.

Figure 12:
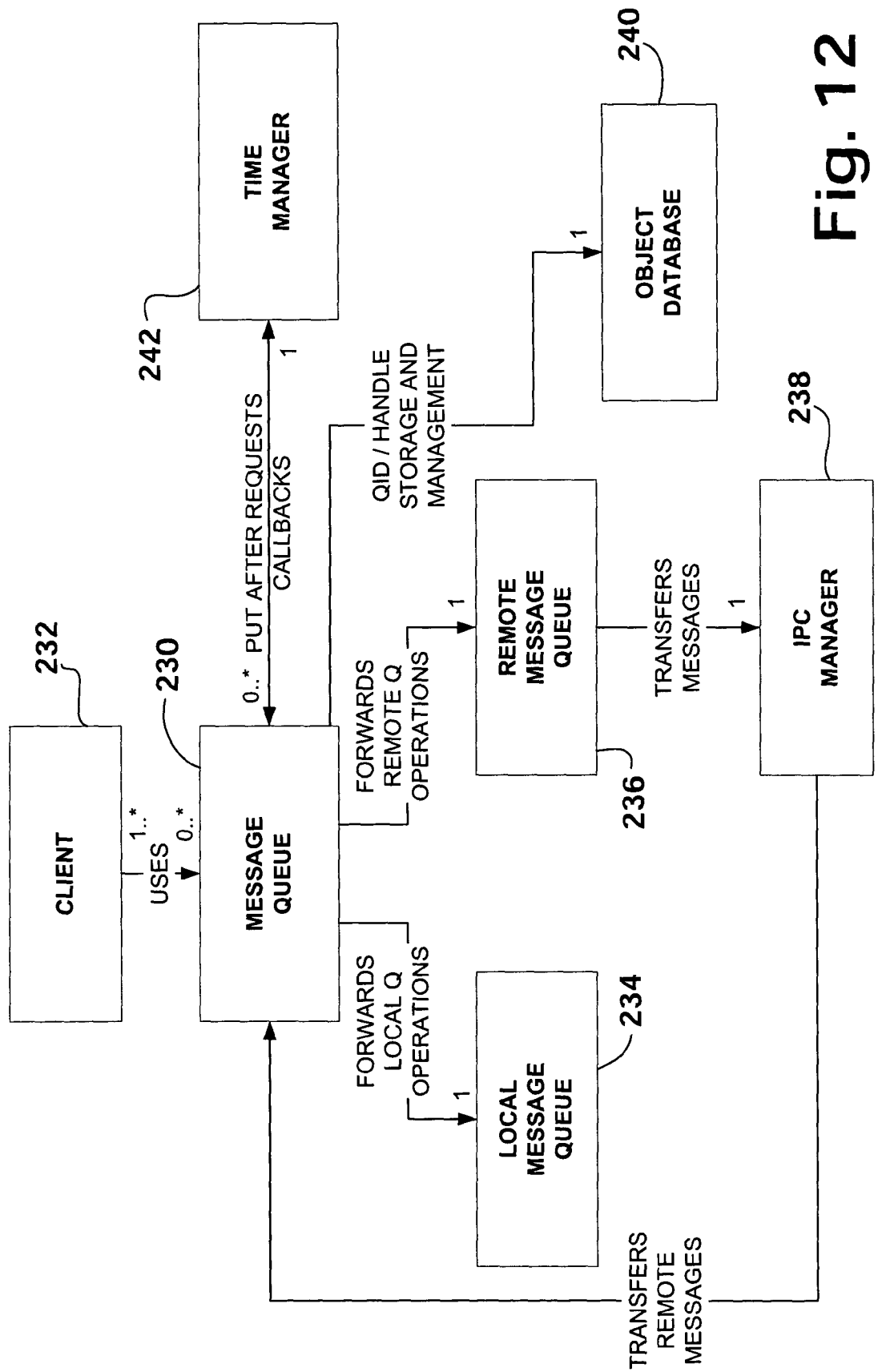
FIG. 12 illustrates the design of the message queue construct.

FIG. 12 illustrates the design of the message queue construct. Clients 232 use message queues as per the OS API 120. To implement its required functionality, the message queue 230 utilizes the services of several subordinate modules. The local message queue 234 and the remote message queue 236 represent specialized queue instances. These elements provide the functionality required to perform queue operations locally (i.e. on the same processor as the client) and remotely (i.e. on the opposite processor). The generalized message queue 230 forwards service requests to these subordinates based on queue type.

A local message queue 234 represents the physical queue, and it is self-contained. This object may be either OS dependent or OS independent. A remote message queue 236 represents a proxy for a queue physically located on the opposite processor. It coordinates the transfer of messages to its associated queue via the IPC Manager 238. The IPC Manager 238 transfers messages across the processor boundary, and utilizes the standard message queue "put" service to queue the message in the physical queue. The IPC Manager contains separate components executing on each processor.

The object database 240 provides storage and management of active objects (Message Queues and Buffer Queues) within the system. The time manager 242 provides a schedulable callback service. The message queue 230 utilizes this feature to perform "PutAfter", and "CancelPutAfter" requests. This service is provided above (or before) the local/remote distinction. Thus, all "PutAfter" timing executes local to the sending or putting client. This design is used to keep the sending client as close as possible to the timer, coupling the timer to the sender and not the receiver.

Figure 13:
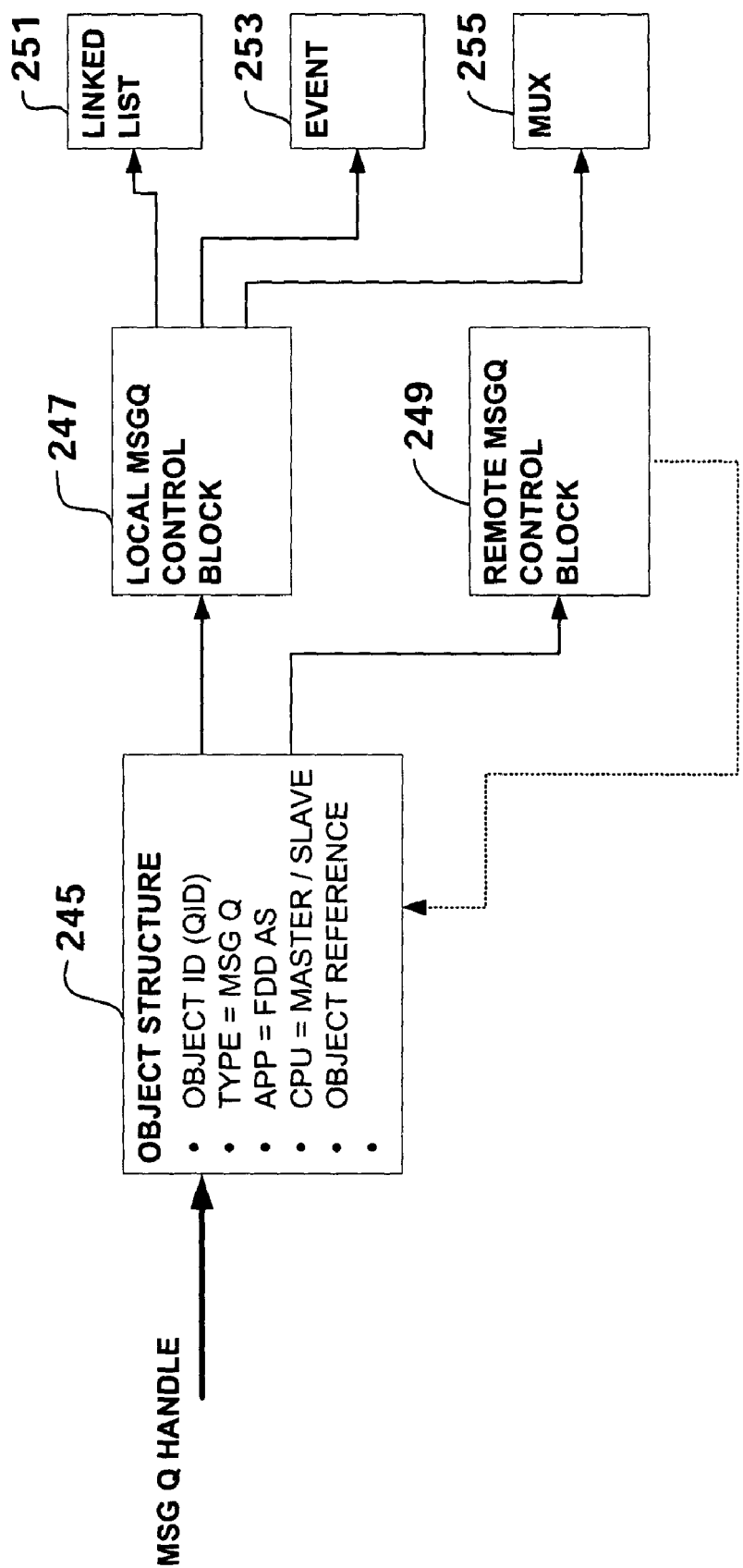
FIG. 13 illustrates the message queue control block data structures.

FIG. 13 illustrates the message queue control block data structures and their relationships. Both message queue create and look-up operations return a reference to an OS object structure (control block) 245 as the message queue handle. In the local queue case, the object structure refers to a local message queue control block via an OS handle. The local message queue control block 247 contains information required to control a local queue. The message queue module 230 supplies this handle to the local message queue module 234 whenever it forwards service requests. The remote message queue control block 249 contains information required for control of the remote queue.

For the local message queue, the control block includes: a linked list 251 used to store messages in priority order, an event 253 used to implement the blocking "Wait" message queue call, and a mutex 255 used to protect the generic queue data structure.

The buffer queue utilizes the same general framework as message queues with the exception of priority. Buffers cannot be placed into a buffer queue based on priority. They are strictly "first-in-first-out".

The object database provides storage and management of active objects within the system. Objects are defined as OS constructs that are explicitly designed to be shared across thread, and processor boundaries, including message queues which support communication between threads (control and data) and buffer queues which support the transfer of large data blocks between threads.

Objects are identified using the following information types: Object ID which is a unique object identifier within an application, object type which is the type of the object, and message queue, buffer queue, etc., and application ID which is a unique identifier of each application. The application ID field is used for the FDD SoC requirements. Other information stored for each object is: object handle which is a handle for the actual object and a processor which is a processor location: master/slave.

Similar to the application ID, the need and use of the processor field is determined as the protocol stack design progresses, specifically in regards to IPC. The distributed environment feature of the OS API is optional.

Figure 14:
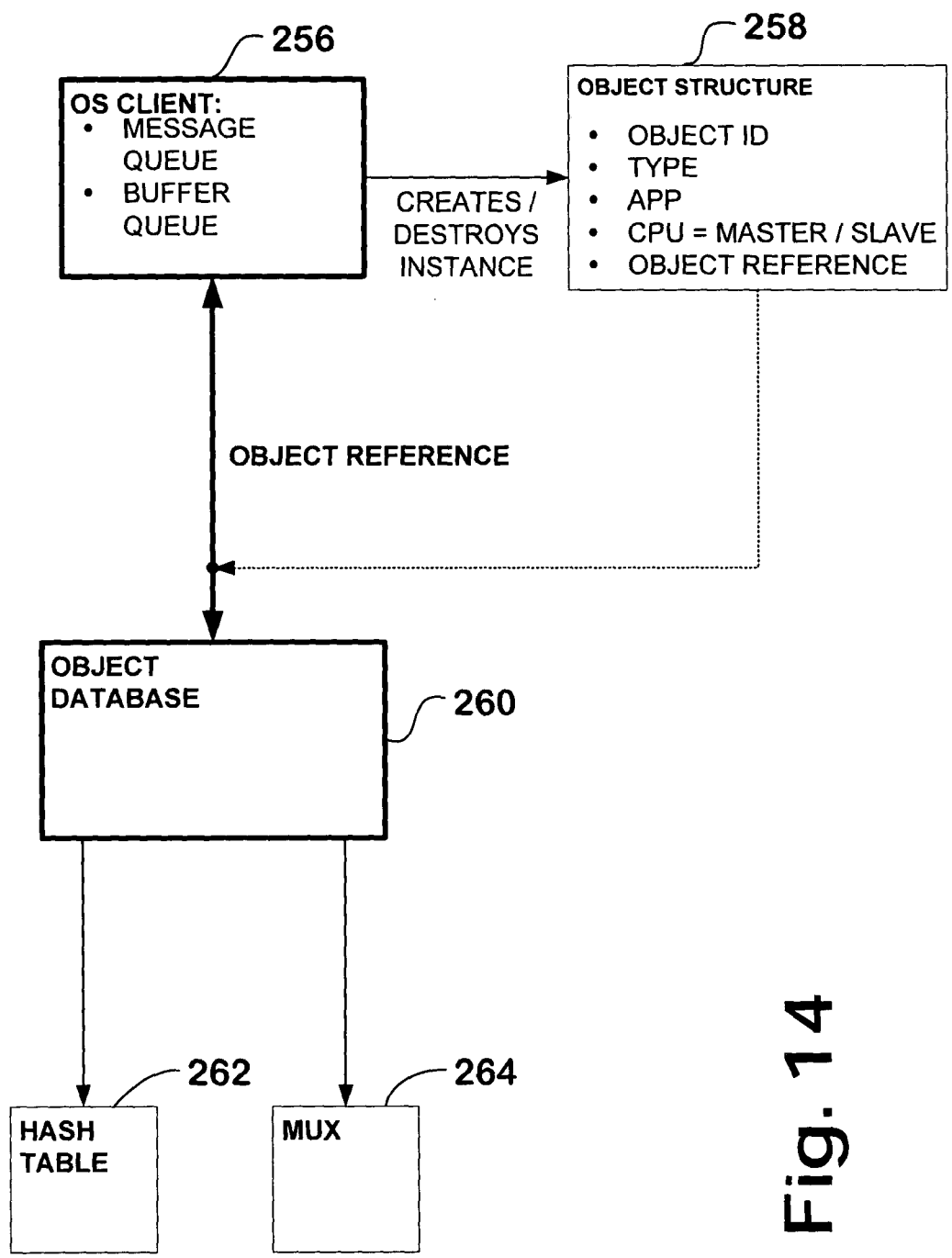
FIG. 14 is an illustration of an object database implemented in an OS-independent manner.

The object database 260, as shown in FIG. 14, is implemented in an OS-independent manner. Each object has an object structure 258, typically including an object ID, type, application, CPU=Master/Slave and Object reference. The OS client initiates the creation and destruction of these objects. Object references are stored within a hash table 262. A combination of Application ID, Object ID, and Object Type is as the hash table key. The database utilizes a mutex 264 to thread protect the hash table 262.

The OS layer 114 preferably provides a time management function. The OS layer 114 provides two sets of time-related functionality, API time services and an OS layer internal callback mechanism based on time. The API time services include os_gettime and os_delayMilliSec. The internal callback mechanism allows OS constructs to schedule callbacks based on time (milliseconds). This feature is used to provide their own time related services (for example, the "Put After Time" service provided by Message Queues).

Time management functionality within the OS layer is divided into two modules as follows:

OS_TimeMgr: contains the Time Manager (which provides callbacks, see below), and all OS independent API calls (os_getTime).

<os>_Time: contains the OS specific Timer used by the Time Manager (this object is typically OS dependent), and all OS dependent API calls (os_delayMilliSec).

Figure 15:
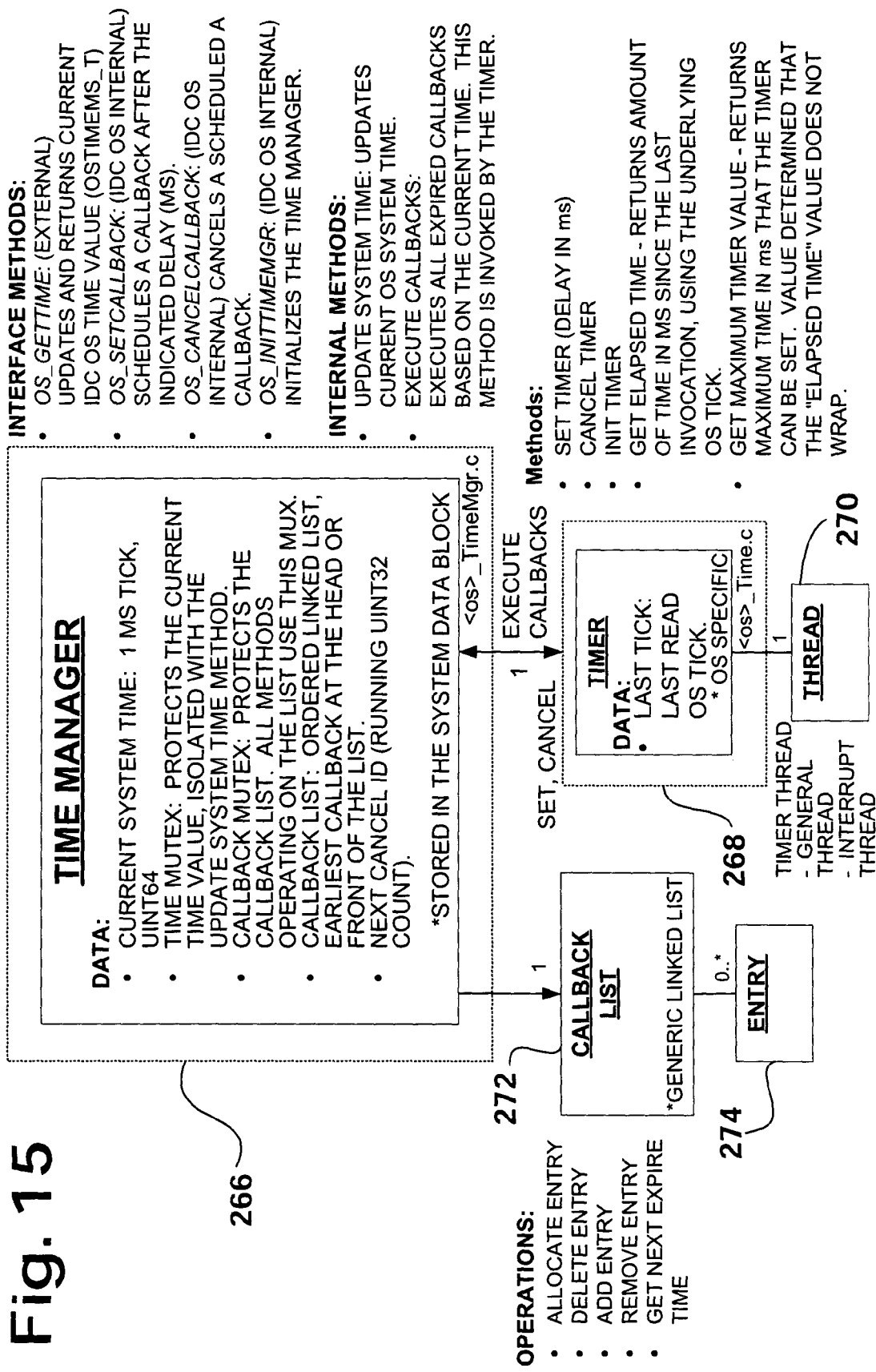
FIG. 15 is an illustration of a time manager object.

The time manager object 266, as shown in FIG. 15, provides most of the time-relative functionality. The API os_getTime entry point is implemented returning the current OS Time (1 ms tick from start-up). It, also, provides the callback service utilized by other OS constructs to provide own time-relative functions. The callback feature allows time manager clients to schedule delayed function calls. They input a function reference, a parameter reference, and a delay. The time manager 266 invokes or "calls back" the function, supplying the indicated parameter, after the delay.

Callback functions provided to the time manager perform minimal processing in order to maintain timing integrity. Callback execution takes place in the context of the timer thread 270. Extended processing effects other callbacks. As such, complex operations must be handed off to another thread.

The time manager 266 uses two subordinates to provide this functionality:

CallBack List 272 is an ordered list of callback requests, earliest (soonest to expire) to latest. This list manages outstanding callbacks, and their information (function, parameter, etc.). The operations of the callback list 272 are to allocate entries 274, delete entries 274, add entries 274, remove entries 274 and to get next expire times.

Timer 268 provides an internal thread 270 that is woken up or scheduled based on callback delays. Specifically, the time manager 266 sets the timer 268 for the shortest callback delay. When the delay expires, the timer 268 signals the manager 266 to execute the callback. This cycle continues with the time manager 266 always scheduling the shortest delay in the timer 268. When the CallBack List 272 empties, the manager 266 sets the timer 268 for the minimum period required to detect underlying OS tick wrap conditions.

Figure 16:
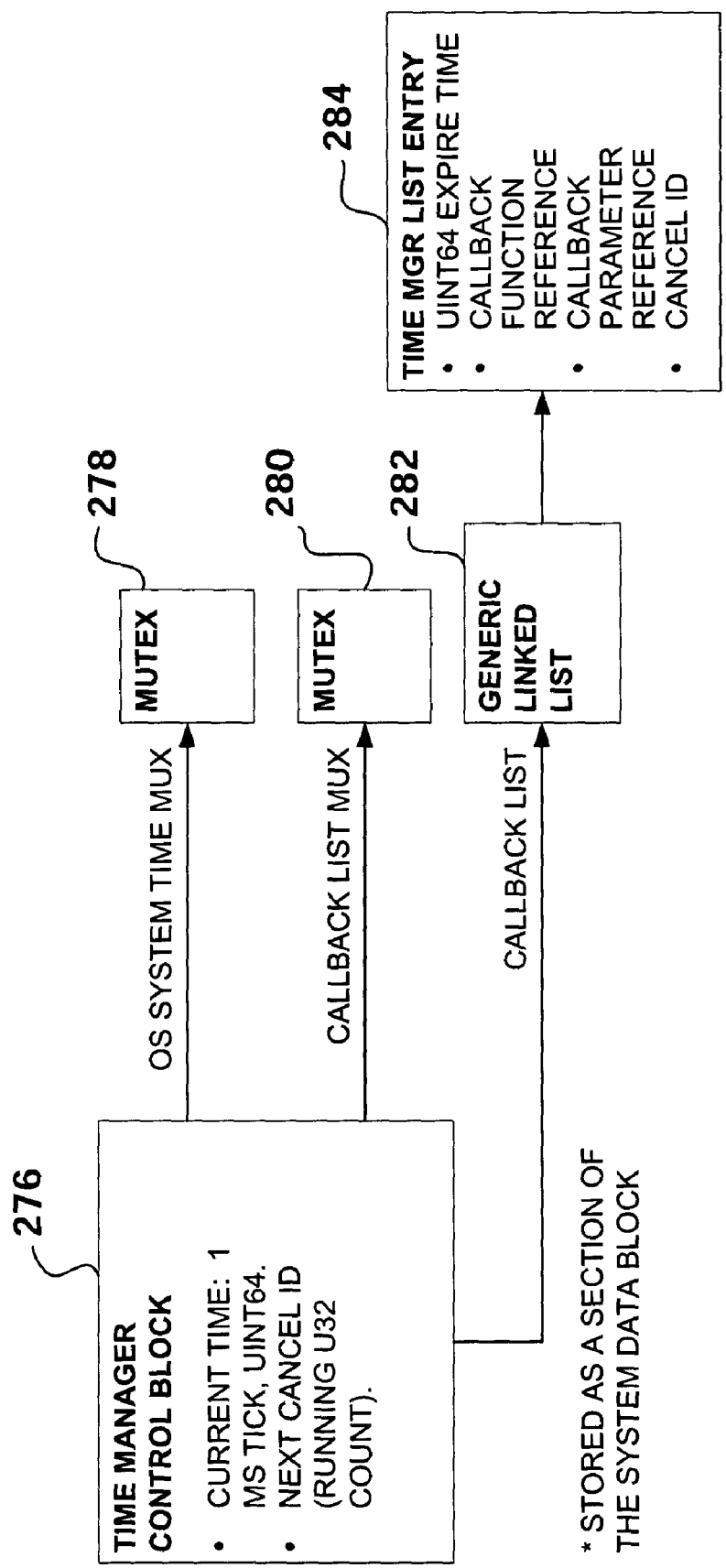
FIG. 16 is an illustration of time manager control block functionality.

FIG. 16 illustrates a time manager control block functionality. The time manager control block 276 is associated with Muxs 278, 280 and a generic linked list 282. One of the Muxs is the OS system time MUX 278 and the other is a CallBack list Mux 280. The generic linked list 282 (CallBack List) has a time manager list entry 284. The time manager list entry has a Uint64 expire time CallBack function, a CallBack function reference, a CallBack parameter reference and a cancel ID.

Figure 17:
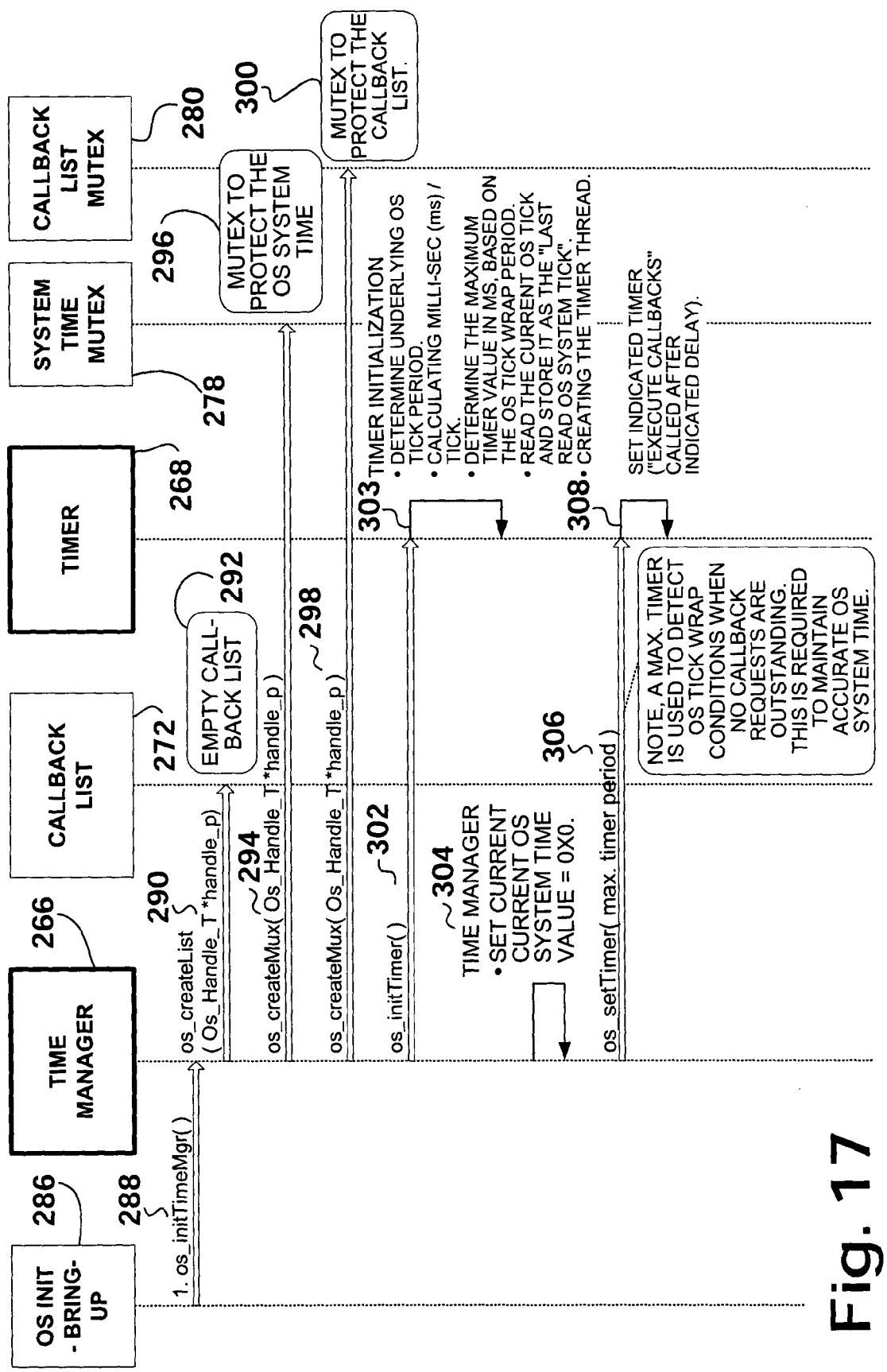
FIG. 17 is a flow diagram of a creation/initialization time manager scenario.

FIG. 17 is a preferred flow diagram of a creation/initialization time manager scenario. The OS initiates the bring-up 286 of the time manager, 288. The time manager 266 sends an "os_createList(Os_Handle_T*handle_p)" message to empty the Call Back list, 290, 292. The time manager 266 sends an "os_createMux(Os_Handle_T*handle_p)" message to the system time Mux 278 so that a Mux is produced to protect the OS system time, 294, 296. The time manager 266 sends an "os_createMux(Os_Handle_T*handle_p) to the CallBack list Mux 280 so that a Mux is produced to protect the CallBack list, 298, 300.

The time manager 266 sends an "os_initTimer( )" message to the timer 268 to initialize the time, 302, 303. The timer initialization includes:

Determining underlying OS tick period.

Calculating ms/tick.

Determining the maximum timer value in ms, based on the OS tick period.

Reading the current OS tick and store it as the "Last Read OS System Tick".

Creating the timer thread.

The time manager 266 initializes itself, 304, which includes setting the current Current OS system time value to 0×0. The manager 266 sends an "os_setTimer(max.timer period) message to the timer 268 so that the indicated timer is set ("Execute CallBacks" called after the indicated delay), 306, 308.

Figure 18:
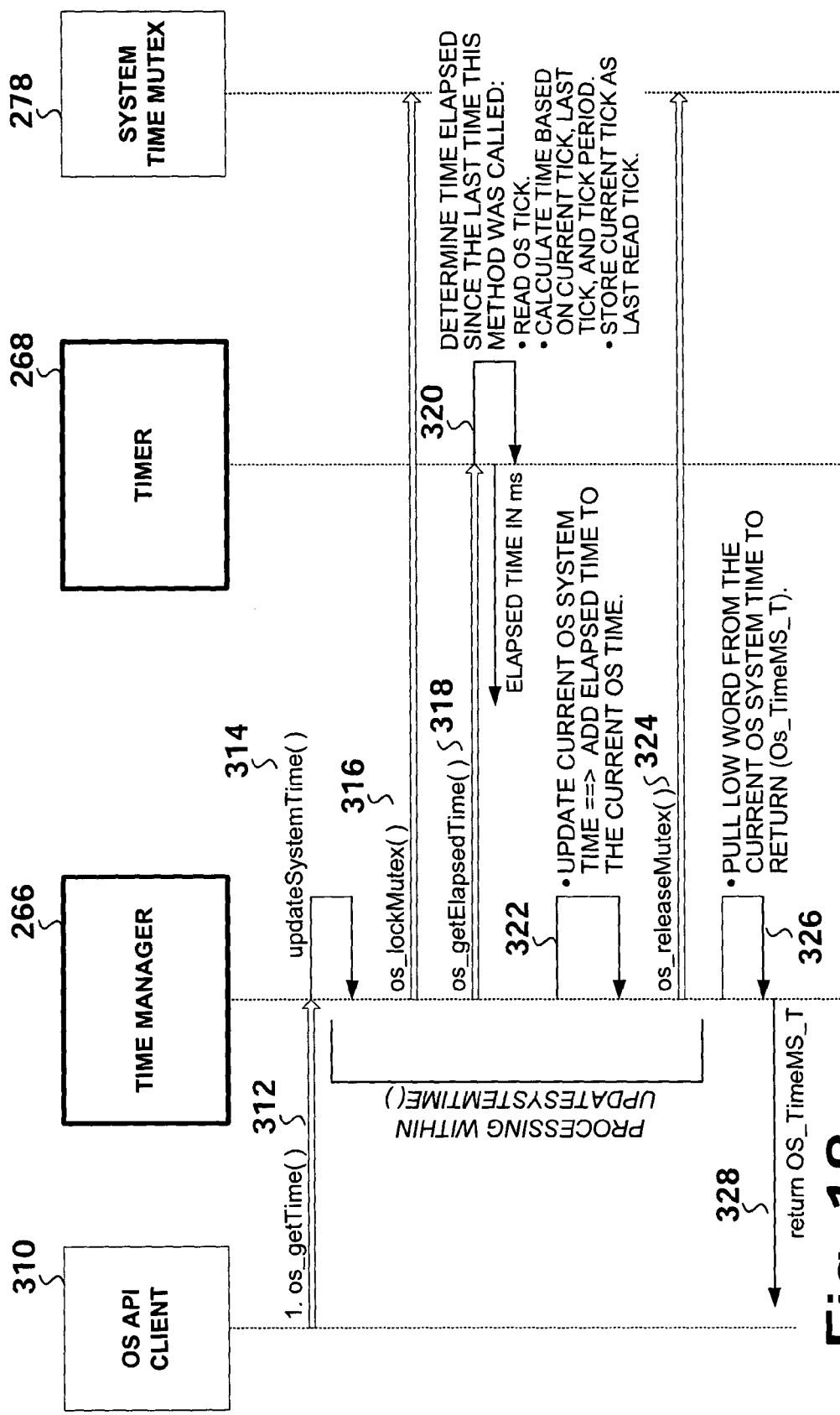
FIG. 18 is a flow diagram of a get OS time time manager scenario.

FIG. 18 is a preferred flow diagram of a get OS time manager scenario. The OS API client 310 send an "os_getTimer( )" message to the time manager 266 to update the system time ("updateSystemTime( )"), 312, 314. The time manager 266 sends a lock Mux message ("os_lockMutex( )") to the system time Mux 278, 316. A "os_getElapsedTime( )" message is sent to the timer 268 so that the time elapsed since the last time a call was initiated is determined, 318, 320. The determination includes reading the OS tick, calculating the time based on the current tick, last tick and the tick period, and storing the current tick as the last read tick.

The time manager 266 updates the current OS system time and adds the elapsed time to the current OS time, 322. A release Mux message ("os_releaseMutex( )") is sent to the system time Mux 278, 324. The time manager 266 pulls the low word from the current OS system time to return ("Os_TimeMS_T") and the time is returned to the OS API client 310("return Os_TimeMS_T"), 326, 328.

Figure 19:
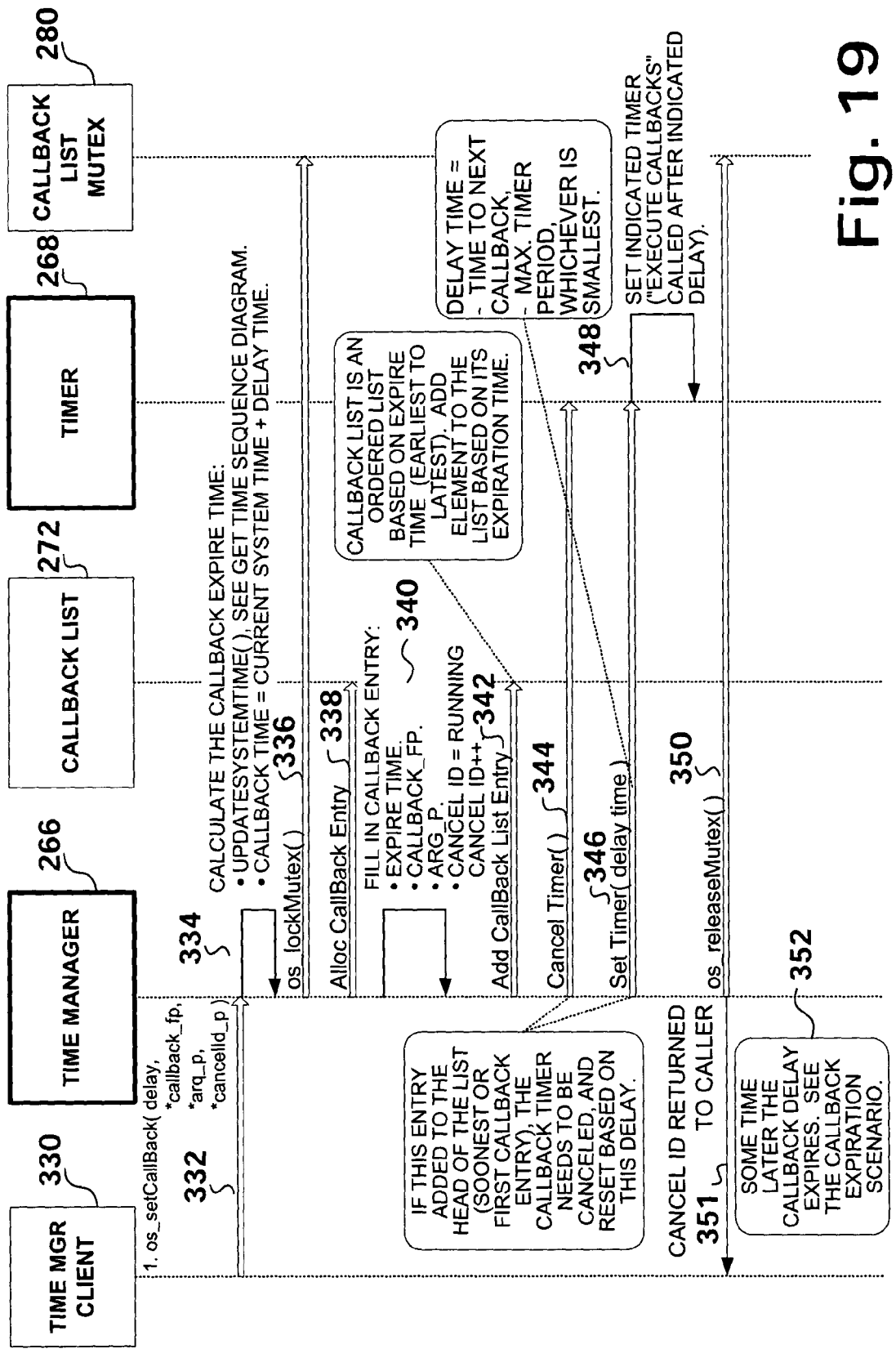
FIG. 19 is a flow diagram of a set CallBack time manager scenario.

FIG. 19 is a preferred flow diagram of a set CallBack time manager scenario. The time manager client 330 sends an "os_setCallBack" message to the time manager 266, 332. The time manager 266 calculates the CallBack expire time, 334. This calculation includes updating the system time and setting the CallBack time equal to the current system time plus a time delay.

The time manager 266 sends a loc Mux message ("os_lockMutex( )") to the CallBack list Mux 280, 336. The manager 266 sends an allocate CallBack entry message ("Alloc CallBack Entry") to the CallBack list 272, 338. The manager 266 fills in the CallBack Entry with "Expire Time", "callback_fp", "arg_p" and "Cancel ID=running cancel ID++", 340.

The manager 266 sends an add callback list entry message ("Add CallBack List Entry") to the CallBack list 272, 342. The CallBack list is preferably an ordered list based on the expire time (earliest and latest). An element is added to the list based on its expiration time. Of the entry is added to the head of the list (soonest to first callback entry), the callback timer is canceled and reset based on this delay. The time manager 266 sends a cancel timer message ("Cancel Timer( )") to the timer 268, 344. The manager 268 also sends a set timer message ("Set Timer(delay time)") to the timer 268, 346. The delay time is set to the smaller of the time to the next callback or the maximum timer period. The timer 268 sets the indicated timer ("Execute CallBacks" called after indicated delay), 348. The manager 266 sends a release Mux 350 to the CallBack list Mux 280, 350. The cancel ID is returned to the caller, 351. This occurs sometime after the callback delay expires, 352.

Figure 20:
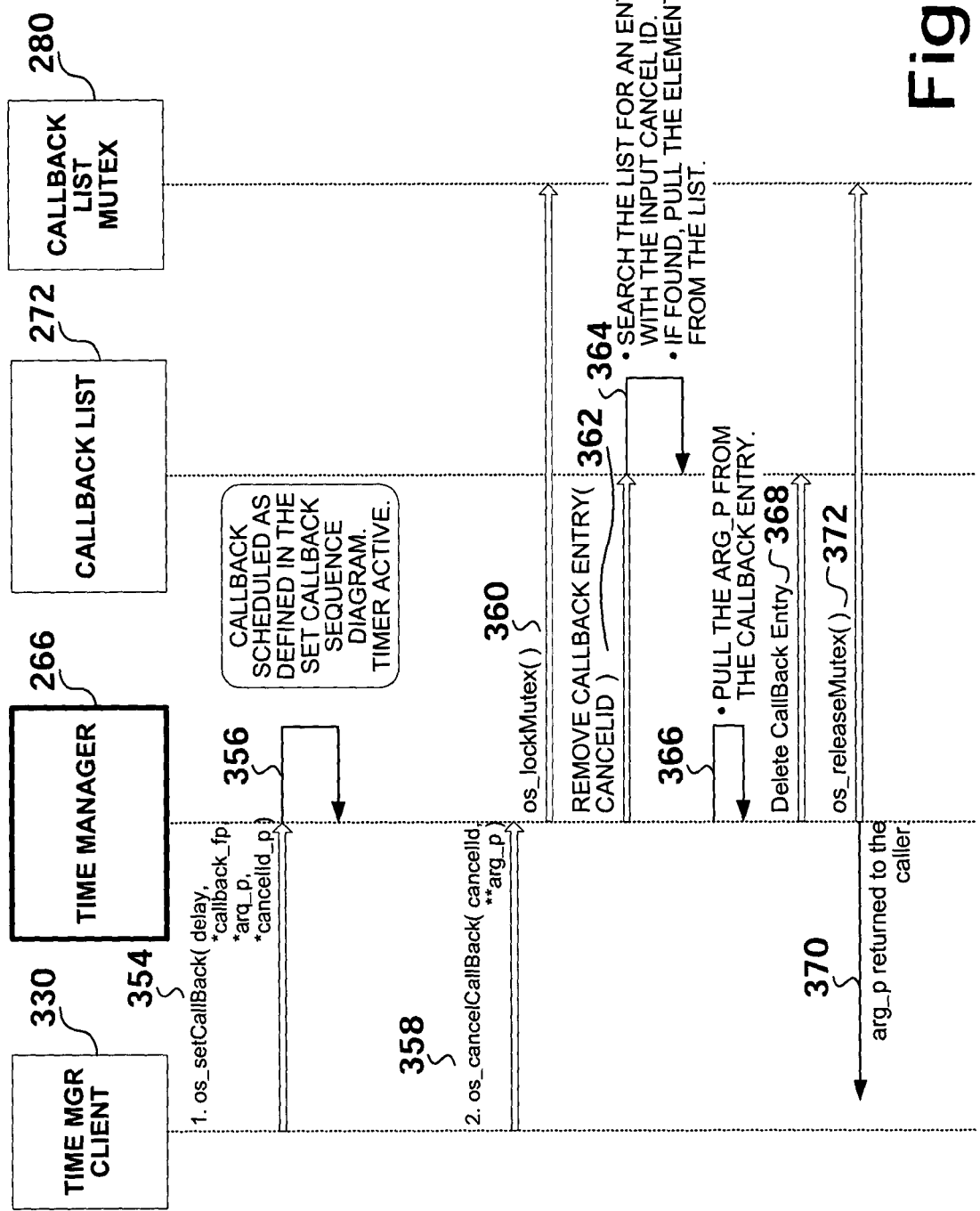
FIG. 20 is a flow diagram of a cancel CallBack time manager scenario.

FIG. 20 is a preferred flow diagram of a cancel CallBack time manager scenario. The time manager client 330 sends a set CallBack message ("os_setCallBack") to the time manager 266, 354. The time manager 266 schedules a CallBack with the timer active, 356. The time management client 330 sends a cancel CallBack message ("os_cancelCallBack") to the time manager 266, 358. The manager 266 sends a lock Mux message ("os_lockMutex( )") to the CallBack list Mutex 280, 360. The manager 266 sends a remove CallBack entry with cancel ID ("Remove CallBack Entry(cancelid)") to the CallBack list 272, 362. The Callback list 272 searches the list for an entry with the input cancel ID and if it fins one, it pulls the element from the list, 364.

The time manager 266 pulls the arg_p from the CallBack entry, 366. The manager deletes the CallBack entry, 368. A release Mux message ("os_releaseMutex 0") is sent to the CallBack list Mux 280, 372 and an arg_p is returned to the caller, 370.

Figure 21:
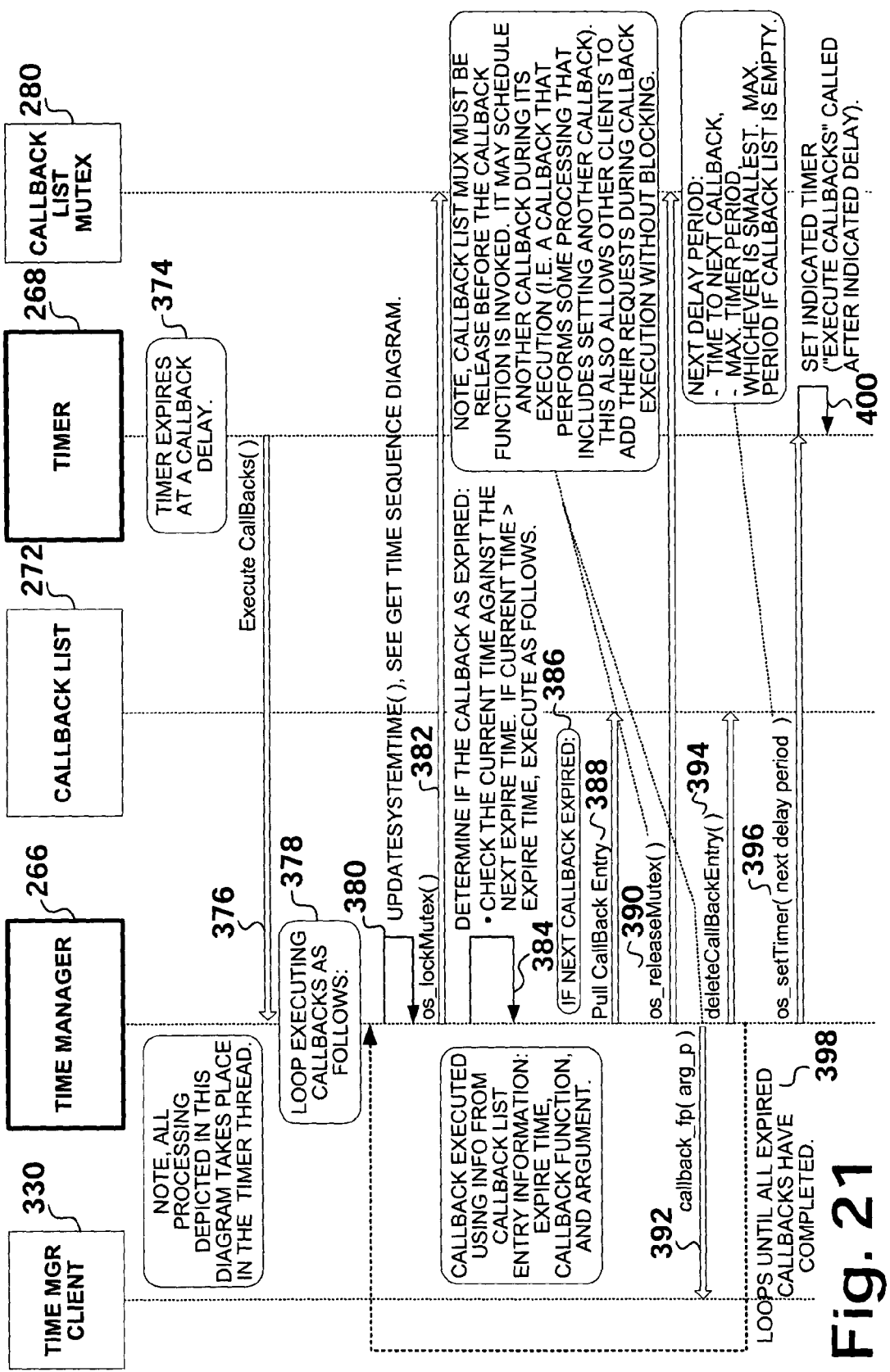
FIG. 21 is a flow diagram of an execute CallBack time manager scenario.

FIG. 21 is a preferred flow diagram of an execute CallBack time manager scenario. The processing illustrated in FIG. 21 is preferably performed in the timer thread. The timer 268 expires at the CallBack delay, 374. The timer executes a CallBack ("Execute CallBack( )") to the time manager 266, 376.

A loop executes the CallBacks as follows, 378. The manager 266 updates the system timer ("updateSystemTime( )"), 380. The manager sends a lock Mux message ("os_lockMutex( )") to the CallBack list Mux 280, 382. The manager 266 setermines if the CallBack is expired by checking the current time against the next expire time. If the current time is greater than the expire time, the following is performed, 384.

If the next CallBack expires, 386, a pull CallBack entry message is sent to the CallBack list 272, 388. Callback list Mux 280 is released before the callback function is invoked. It may schedule another callback during its execution (i.e. a callback that performs some processing that includes setting another callback). Other clients are allowed to add their requests during callback execution without blocking. The manager 266 sends a release Mux message ("os_releaseMutex( )") to the CallBack list Mux 280, 390. A "callback_fp (arg_p)" message is sent to the time manager client, 392. The manager 266 sends a delete CallBack entry message ("deleteCallBackEntry( )") to the CallBack list 272, 394. The procedure loops back to step 380 until all the expired callbacks are completed, 398. The manager 266 sends a set timer message ("os_setTimer(next delay period)") to the timer 268. The timer 268 sets the indicated timer ("Execute Callbacks" called after indicated delay), 400.

In the preferred embodiment, the timer 268 is replaced with an OS independent time manager thread. This thread is an OS API Thread and encapsulates both the timer (set, cancel, etc), and the "execute callback" functionality. Mapping from the code to the design:
"pauseCurrentThread"—Set Timer
"wakeCurrentThread"—Cancel Timer
"timeMgrMain"—Thread's main loop, includes Timer Thread and execute callbacks.

Inter-processor communication is primarily performed by an inter-processor message queue interface. The following details the preferred interface between the message queue module and the IPC module (IPC manager and QID database).

Figure 22:
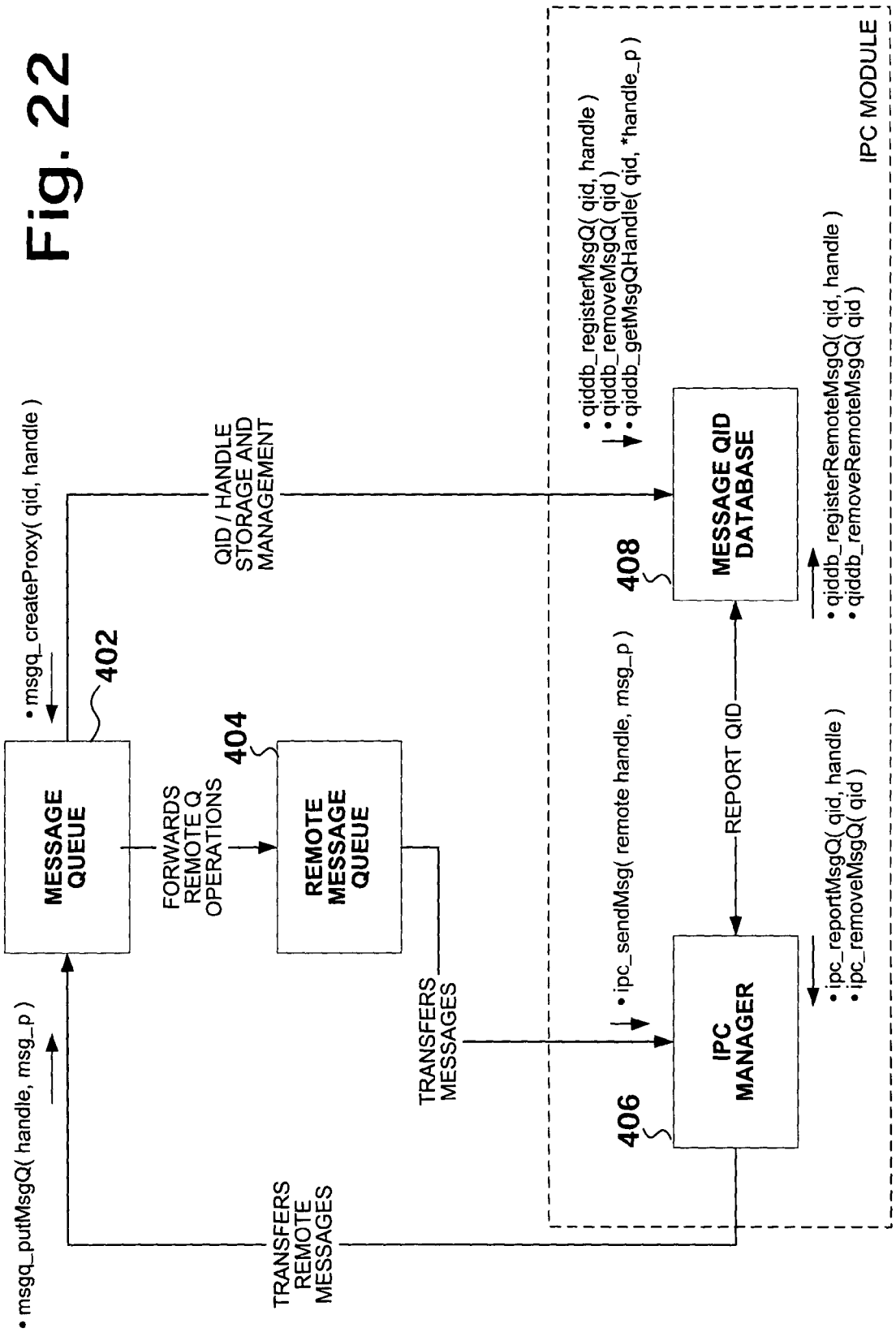
FIG. 22 is an illustration of the message queue with IPC elements.

As shown in FIG. 22, the message queue 402 has the following IPC elements:
Message QID Database 408: Used to both register local message queues with the system, and to gain access to remote message queues.
IPC Manager 406: Remote message queue proxy forwards all "put" requests to its associate queue via the IPC Manager.

The Message Queue 402 forwards all remote operation to a remote message queue 404. The remote message queue transfers the messages to the IPC manager 406.

Figure 23:
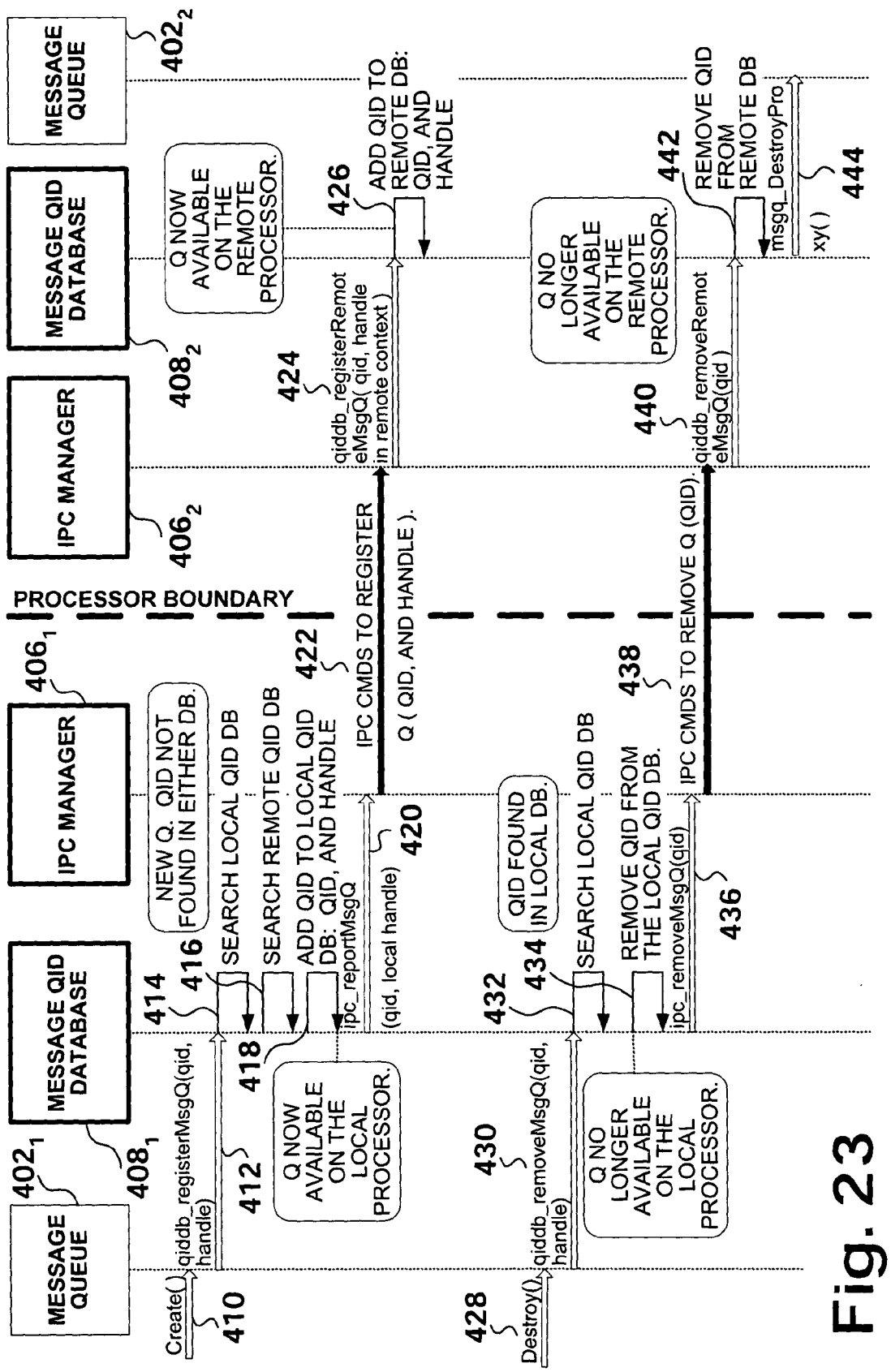
FIG. 23 is a flow diagram of message queue creation and destruction in context with inter-processor communication.

FIG. 23 is a flow diagram of message queue creation and destruction in context with inter-processor communication. A first processor has an associated message queue $402_1$, message QID database $408_1$ and IPC manager $406_1$. A second processor also has an associated message queue $402_2$, message QID database $408_2$ and IPC manager $406_2$. The first processor message queue $402_1$ receives a create massage, 410. A "qidd_registerMsgQ(qid, handle)" message is sent to the message QID database, $408_1$, 412. The database $408_1$ searches the local QID database, 414, the remote QID database, 416, and adds the QID to the local QID database with the QID and the handle, 418.

The queue is now available on the local (first) processor. The message QID database $408_1$ sends a "ipc_reportMsgQ (qid, local handle)" to the IPC manager $406_1$, 420. The manager $406_1$ sends a "IPC cmds to register Q (QID, and handle)" message across the processor boundary to the second processor IPC manager $406_2$, 422. The IPC manager $406_2$ sends a "qidd_registerRemoteMsgQ(qid, handle in remote context)" to the message QID database $408_2$, 424. The queue is now available to the remote (second) processor. The QID is added to the remote database $408_2$ with the QID and handle, 426.

The first processor message queue $402_1$ receive a destroy massage, 428. A "qidd_removeMsgQ(qid, handle)" message is sent to the message QID database, $408_1$, 430. The database $408_1$ searches the local QID database, 432, and removes the QID to the local QID database, 434.

The message QID database $408_1$ sends a "ipc_removeMsgQ(qid)" to the IPC manager $406_1$, 436. The manger $406_1$ sends a "IPC cmds to remove Q (QID)" message across the processor boundary to the second processor IPC manager $406_2$, 438. The IPC manager $406_2$ sends a "qidd_removeRemoteMsgQ(qid)" to the Message QID database $408_2$, 440. The queue is no longer available on the remote (second) processor. The message QID database $408_2$ removes the QID from the remote database, 442, and a destroy message proxy ("msgq_DestroyProxy( )") is sent to the message queue, 444.

Figure 24:
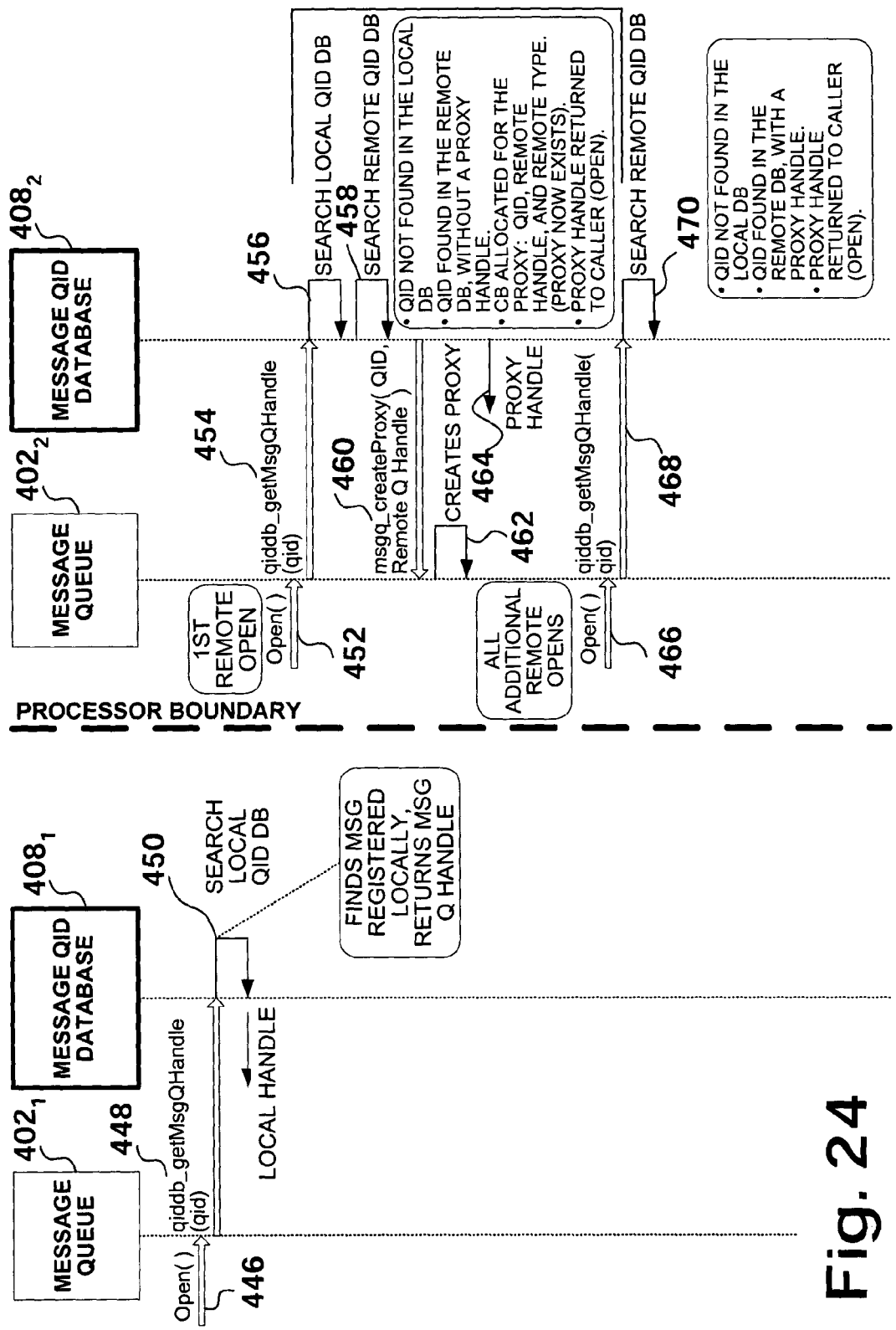
FIG. 24 is a flow diagram of message queue opening in context with inter-processor communication.

FIG. 24 is a flow diagram of message queue opening in context with inter-processor communication. The message queue $402_1$ receives an open message, 446. The message queue $402_1$ sends a "qiddb_getMsgQHandle(qid)" message to the message QID database $408_1$, 448. The message QID database searches the local QID database for the message registered locally and returns the message queue handle, 450. The local handle is returned.

At the remote (second processor), if the first remote is open, an open message is received by the message queue $402_2$, 452. The message queue $402_2$ sends a "qiddb_getMsgQHandle(qid)" to the message QID database $408_2$, 454. The message QID database $408_2$ searches the local QID database and the remote QID database, 456, 458. If the QID not found in the second processor database, it is created. The QID in the remote database is found, without a proxy handle. The CB is allocated for the proxy: QID, remote handle, and remote type. The proxy now exists. The proxy handle is returned to the caller (open). A create proxy message ("msgq_createProxy (QID, Remote Q_Handle)") is sent to the message Queue $402_2$., 462, and a proxy is created, 462. The proxy handle is returned by the message QID database $408_2$, 464.

If all additional remotes are open, the open message is received by the message queue $402_2$, 466. The message queue $402_2$ sends a get message handle message ("qiddb_getMsgQHandle(qid)") to the message QID database $408_2$. The message QID database $408_2$ searches the remote QID database, 470. If the QID is found in the local database with a proxy handle, the proxy handle is returned to the caller (open).

Figure 25:
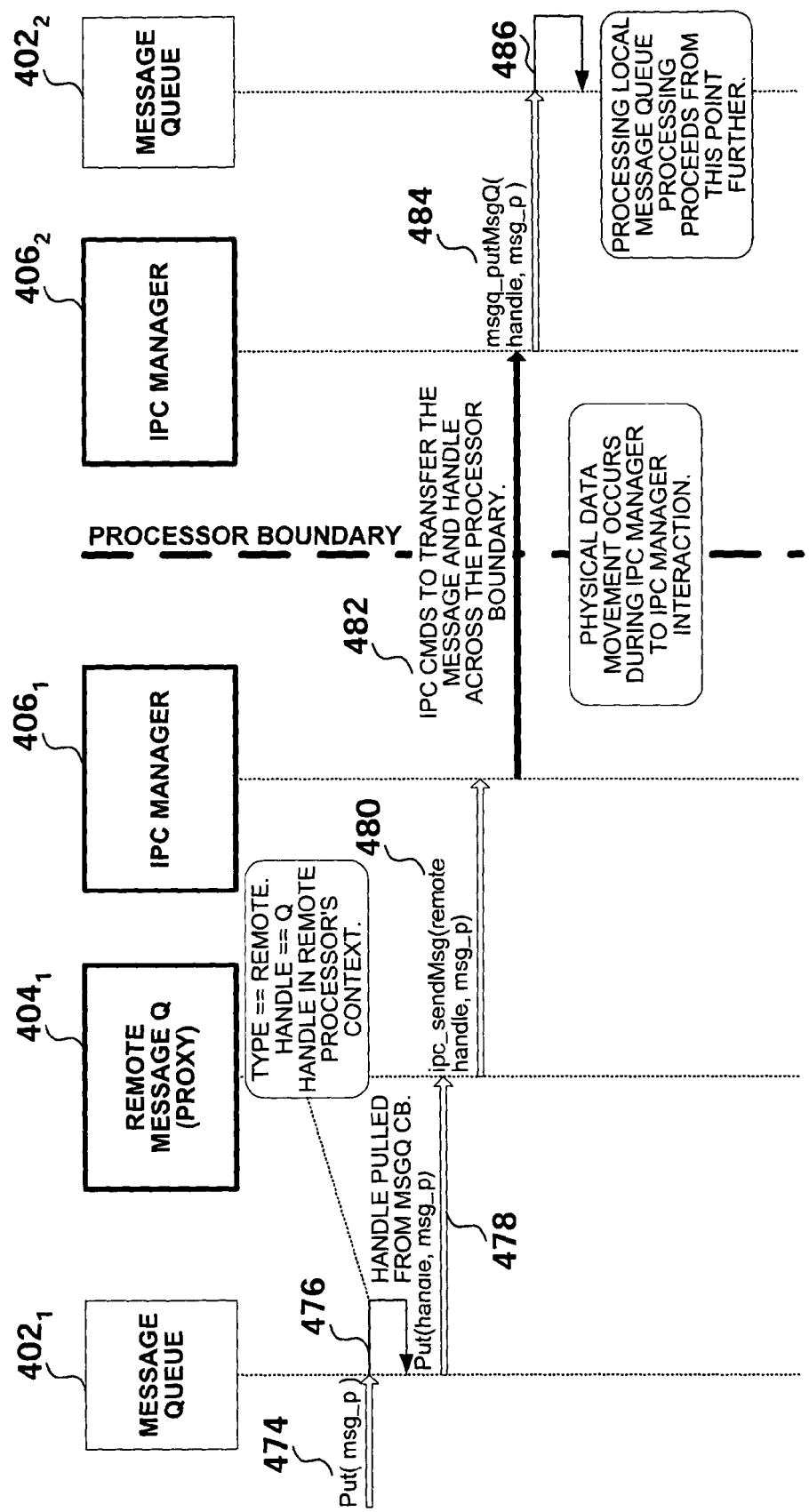
FIG. 25 is a flow diagram of message queue remote put in context with inter-processor communication.

FIG. 25 is a flow diagram of message queue remote put in context with inter-processor communication. A put message ("Put(msg_p)") is received by the message queue $402_1$, 474.

The message queue pulls the handle from the MsgQ CB, 476. The "Type" is set to remote and the "handle" is set to Q handle in the remote processor's context. A put message ("Put (handle, msg_p") is sent to the remote message queue (proxy) 404₁, 478. The remote queue 404₁ sends a "ipc_sendMsg (remote handle, msg_p)" message to the IPC manager 406₁, 480. The IPC manager 406₁ commands the message and handle across the processor boundary to the other IPC manager 406₂, 482. The physical data movement occurs during IPC manager to IPC manger interaction. That IPC manager 406₂ sends a "msgq_putMsgQ(handle, msg_p)" to the message queue 402₂, 484. The message is put in the queue, 486 and processing of the local message queue proceeds.

Figure 26:
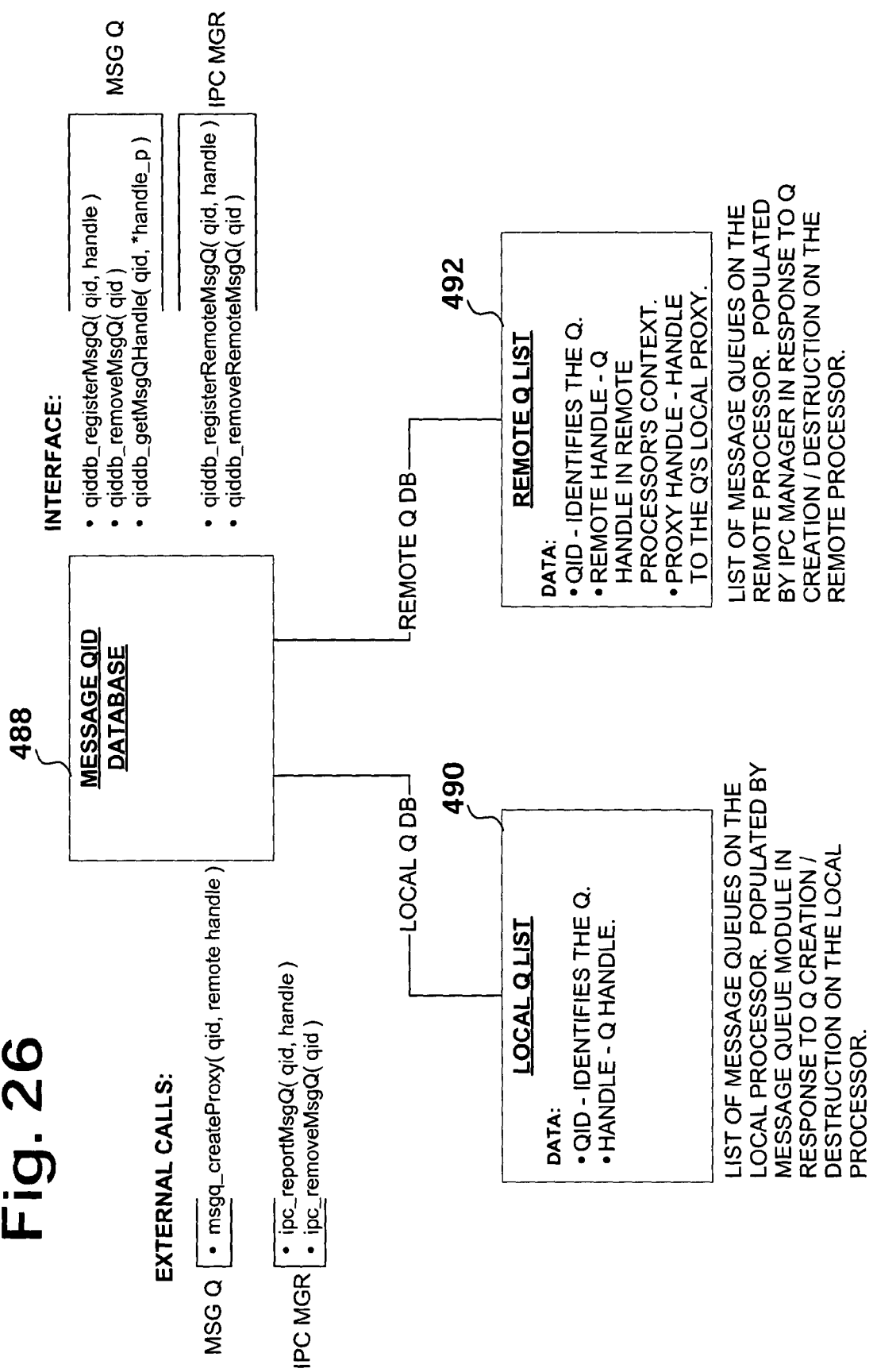
FIG. 26 is an illustration of a message QID database.

The message QID database 488 is illustrated in FIG. 26. The message QID database 488 utilizes two lists to manage local 490 and remote queue 492 instances. The local database 490 stores QID and local handle for local queue instances. Similarly, the remote database 492 maintains QID, remote handle, and local proxy handle for remote queues.

The message queue interface registers the message queue by: verifying the queue does not exist in the system (local or remote), adding the queue to the local message queue database, and informing the remote database of this queue via the IPC manager (IPC report message queue).

To remove a message queue, the following is performed: deleting the queue from the local message queue database and removing the queue from the remote database via the IPC manager (IPC remove message queue). To get the message queue handle for a local queue, the local queue's handle is returned. For a remote queue, the remote queue's proxy handle is returned. If is does not exist, a proxy creation is triggered via the message queue module (Create Proxy).

To register a remote message queue, the following is performed: the IPC manager calls when it receives notification that a message queue was created on the opposite processor and the queue is added to the remote message queue database. A proxy is not created until the message queue is opened locally.

To register a message queue, the following is performed: the IPC Manager calls when it receives notification that a message queue was destroyed on the opposite processor and the queue is removed from the remote message queue database.

What is claimed is:

1. A method for exporting a specification and description language (SDL) software model to different operating systems, the method comprising:
   providing an SDL software model;
   providing an SDL porting layer, the SDL porting layer converting the SDL software model to an operating environment wherein
   the operating environment is common to all the different operating systems; and
   providing a plurality of operating system abstraction layers, each abstraction layer designed to abstract the operating environment to at least one targeted operating system;
   wherein the plurality of abstraction layers utilize a naming convention to specify which modules are operating system (OS) dependent and which are OS independent: and wherein the abstraction layer comprises a plurality of OS constructs, the plurality of OS constructs further comprising:
   a Thread, said thread including an independent path of execution;
   a Process, said process including an independent path of execution with its own protected address space;
   a Thread Group, said Thread Group including a grouping of threads, managed collectively to synchronize their execution;
   a Mutex, said Mutex including a Thread synchronization element providing mutual exclusion to shared resources; and
   an Event, said Event including a Thread synchronization element, allowing threads to coordinate execution.

2. The method of claim 1 wherein the at least one targeted operating system is a single operating system.

3. The method of claim 1 wherein the at least one targeted operating system is two operating systems and the method for exporting a software model in a wireless device, a first of the two operating systems is a system operating system and a second of the two operating systems is a communication operating system.

4. The method of claim 3 wherein the system operating system operates on an advanced reduced instruction set processor (RISC) and the communication operating system operates on a digital signal processor (DSP).

5. The method of claim 3 wherein a communication module facilitates communication between the RISC and DSP.

6. The method of claim 5 wherein the communication module has an associated shared memory for use in performing operations of code derived from the software model.

7. The method of claim 1 wherein the at least one target operating system is a plurality of operating systems.

8. The method of claim 7 wherein the operating system abstraction layer defines the processor boundaries and facilitates communication across the processor boundaries.

9. The method of claim 1 wherein the operating environment operates independently of processor boundaries.

10. A wireless communication device comprising:
    at least one system processor and at least one communication processor;
    a communication module to facilitate communication between each system and communication processor;
    a shared memory associated with the communication module;
    each system processor and communication processor having an associated operating system, the operating system performing code generated from an SDL software model, the SDL software model being ported to an operating environment wherein the operating environment is the result of an SDL porting layer converting an SDL software model to the operating environment, providing an operating environment, the operating environment common to all the different operating systems, an operating system abstraction layer abstracts the operating environment to each associated operating system;
    wherein the abstraction layer utilizes a naming convention to specify which modules are operating system (OS) dependent and which are OS independent; and wherein the abstraction layer comprises a plurality of OS constructs, the plurality of OS constructs further comprising:
    a Thread, said thread including an independent path of execution;
    a Process, said process including an independent path of execution with its own protected address space;
    a Thread Group, said Thread Group including a grouping of threads, managed collectively to synchronize their execution;
    a Mutex, said Mutex including a Thread synchronization element providing mutual exclusion to shared resources; and an Event, said Event including a Thread synchronization element, allowing threads to coordinate execution.

11. The wireless communication device of claim 10 wherein the wireless communication device is a wireless transmit/receive unit.

12. The wireless communication device of claim 11 wherein the at least one system processor is a advanced reduced instruction set processor and the communication processor is a digital signal processor.

13. The wireless communication device of claim 10 wherein the operating environment operates independently of processor boundaries.

14. The wireless communication device of claim 13 wherein the operating system abstraction layer defines the processor boundaries and facilitates communication across the processor boundaries.

15. A wireless transmit/receive unit (WTRU) comprising a processor further comprising:
  an operating system abstraction layer comprising:
    an interface with an operating environment, wherein the operating environment is the result of an SDL porting layer converting an SDL software model to the operating environment, the operating environment operating independent of underlying operating systems;
    an operating system independent module for performing operations that are not related to a target operating system;
    an operating system dependent module for performing operations that are related to the target operating system; and
    an interface with the target operating system;
  wherein the abstraction layer utilizes a naming convention to specify which modules are operating system (OS) dependent and which are OS independent; and wherein the abstraction layer comprises a plurality of OS constructs, the plurality of OS constructs further comprising:
    a Thread, said thread including an independent path of execution;
    a Process, said process including an independent path of execution with its own protected address space;
    a Thread Group, said Thread Group including a grouping of threads, managed collectively to synchronize their execution;
    a Mutex, said Mutex including a Thread synchronization element providing mutual exclusion to shared resources; and
    an Event, said Event including a Thread synchronization element, allowing threads to coordinate execution.

16. A method for abstracting an operating environment to a plurality of operating systems, the method comprising:
  providing an operating environment wherein the operating environment is the result of an SDL porting layer converting an SDL software model to the operating environment, the operating environment common to all the different operating systems; and
  providing a plurality of operating system abstraction layers, each abstraction layer designed to abstract the operating environment to at least one targeted operating system;
  wherein each abstraction layer utilizes a naming convention to specify which modules are operating system (OS) dependent and which are OS independent; and wherein each abstraction layer comprises a plurality of OS constructs, the plurality of OS constructs further comprising:
    a Thread, said thread including an independent path of execution;
    a Process, said process including an independent path of execution with its own protected address space;
    a Thread Group, said Thread Group including a grouping of threads, managed collectively to synchronize their execution;
    a Mutex, said Mutex including a Thread synchronization element providing mutual exclusion to shared resources; and
    an Event, said Event including a Thread synchronization element, allowing threads to coordinate execution.

17. The method of claim 16 wherein each abstraction layer has a same operating system dependent module and a different operating system independent module.

18. A wireless communication device comprising:
  at least one system processor and at least one communication processor;
  a communication module to facilitate communication between each system and communication processor;
  a shared memory associated with the communication module;
  each system processor and communication processor having an associated operating system, the operating system performing code from an operating system abstraction layer, the abstraction layer interfacing with the operating environment wherein the operating environment is the result of an SDL porting layer converting an SDL software model to the operating environment and having an operating system independent module for performing operations that are not related to a target operating system and an operating system dependent module for performing operations that are related to the target operating system;
  wherein the abstraction layer utilizes a naming convention to specify which modules are operating system (OS) dependent and which are OS independent; and wherein the abstraction layer comprises a plurality of OS constructs, the plurality of OS constructs further comprising;
    a Thread, said thread including an independent path of execution;
    a Process, said process including an independent path of execution with its own protected address space;
    a Thread Group, said Thread Group including a grouping of threads, managed collectively to synchronize their execution;
    a Mutex, said Mutex including a Thread synchronization element providing mutual exclusion to shared resources; and
    an Event, said Event including a Thread synchronization element, allowing threads to coordinate execution.

19. The wireless communication device of claim 18 wherein the wireless communication device is a wireless transmit/receive unit.

* * * * *